United States Patent [19]
Sturt et al.

[11] Patent Number: 6,123,380
[45] Date of Patent: Sep. 26, 2000

[54] AUTOMOTIVE SEAT ASSEMBLY WITH FOLDING STRUCTURAL SUPPORTS FOR STORAGE IN A FOOT WELL FOR AN AUTOMOTIVE VEHICLE BODY

[75] Inventors: Alan Sturt, West Bloomfield; Marcel C. Ban, Troy; William F. Best, Jr., Waterford; Iris Drew, Berkley, all of Mich.

[73] Assignee: Lear Corporation, Southfield, Mich.

[21] Appl. No.: 09/330,691

[22] Filed: Jun. 11, 1999

[51] Int. Cl.⁷ .......................................................... B60N 2/12
[52] U.S. Cl. ........................................... 296/65.09; 297/15
[58] Field of Search .............................. 296/65.01, 65.05, 296/65.08, 65.09, 65.13, 66; 248/429, 430; 297/15, 344.15

[56] References Cited

U.S. PATENT DOCUMENTS

| | | |
|---|---|---|
| 2,929,948 | 3/1960 | Koplin et al. . |
| 3,151,906 | 10/1964 | Roberts . |
| 4,957,321 | 9/1990 | Martin et al. . |
| 4,969,682 | 11/1990 | Gray . |
| 5,195,795 | 3/1993 | Cannera et al. . |
| 5,397,167 | 3/1995 | Fourrey et al. . |
| 5,454,624 | 10/1995 | Anglade et al. . |
| 5,570,931 | 11/1996 | Kargilis et al. . |
| 5,588,707 | 12/1996 | Bolsworth et al. . |
| 5,611,589 | 3/1997 | Fujii et al. . |
| 5,636,884 | 6/1997 | Ladetto et al. . |
| 5,733,005 | 3/1998 | Aufrere et al. . |
| 5,839,773 | 11/1998 | Ban et al. . |

FOREIGN PATENT DOCUMENTS

| | | |
|---|---|---|
| 0 151 426 | 8/1985 | European Pat. Off. . |
| 1452002 | 1/1965 | France . |
| 42 24 427 A1 | 1/1994 | Germany . |

*Primary Examiner*—Dennis H. Pedder
*Assistant Examiner*—Mickki D. Murray
*Attorney, Agent, or Firm*—Brooks & Kushman P.C.

[57] ABSTRACT

A foldable seat assembly for an automotive vehicle including a base mounted by rollers in a track in a floor structure of a vehicle passenger compartment including support legs at the forward end of the vehicle seat assembly, the upper end of the forward legs being mounted pivotally to a lower frame of the vehicle seat portion and the lower end of the forward leg being assembled in a track in a foot well of the floor structure. Rear legs supporting the lower seat portion are joined to a roller assembly in a track located in the passenger compartment at a level above the level of the foot well. A driver-operated linkage mechanism at the rearward end of the lower seat portion unlocks the seat back portion, allowing it to fold over the lower seat portion. The driver-operated linkage mechanism at the forward end of the lower seat portion allows the seat assembly to move forward pivoting at the lower end of the front leg and downwardly for storage in the foot well as the forward legs pivot at their lower ends.

11 Claims, 24 Drawing Sheets

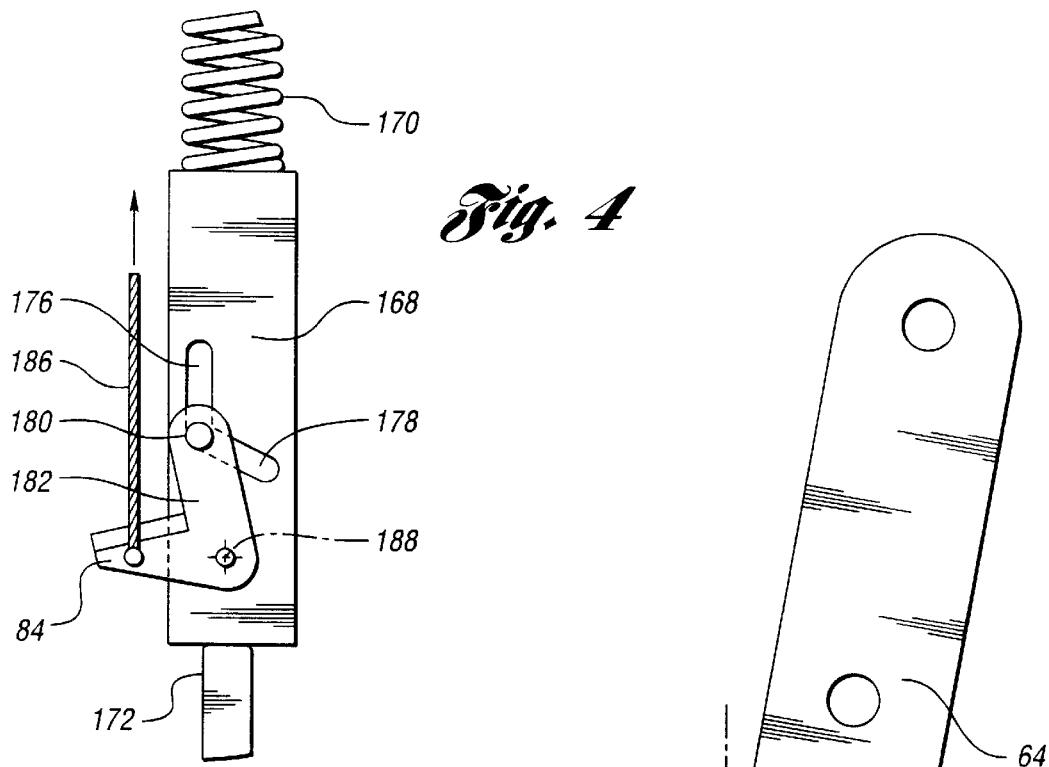
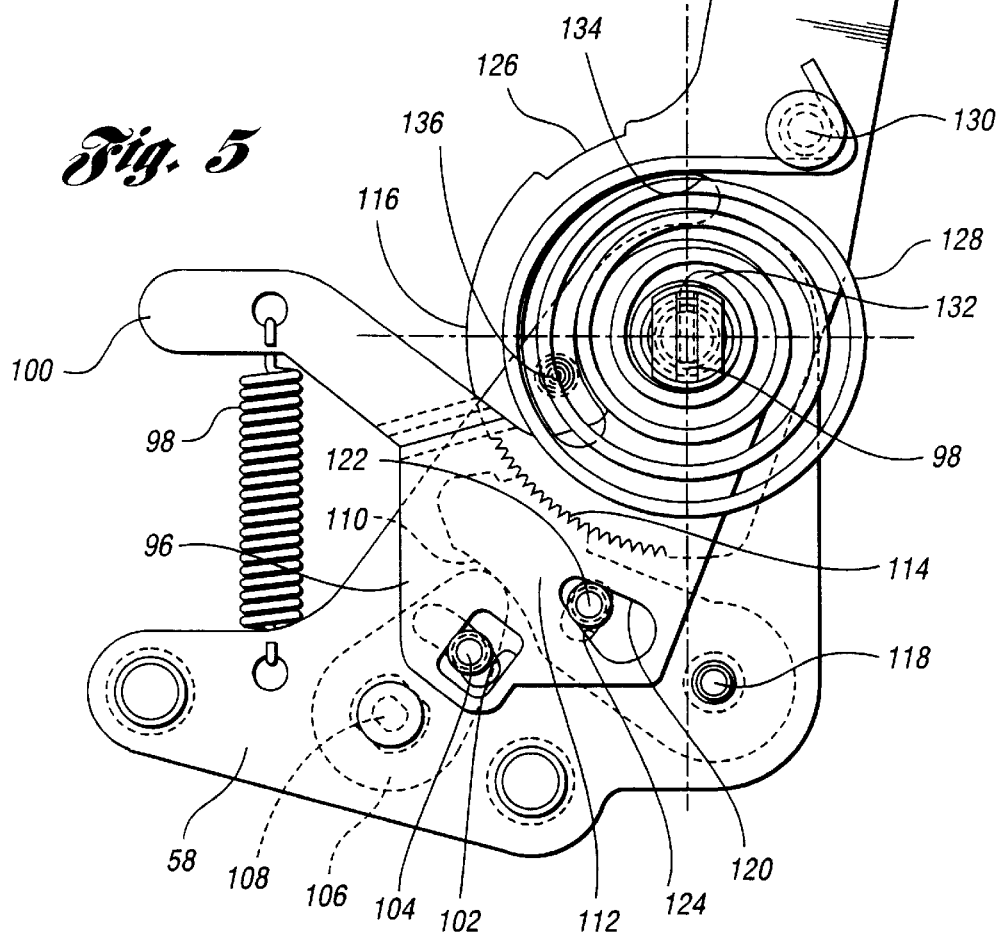

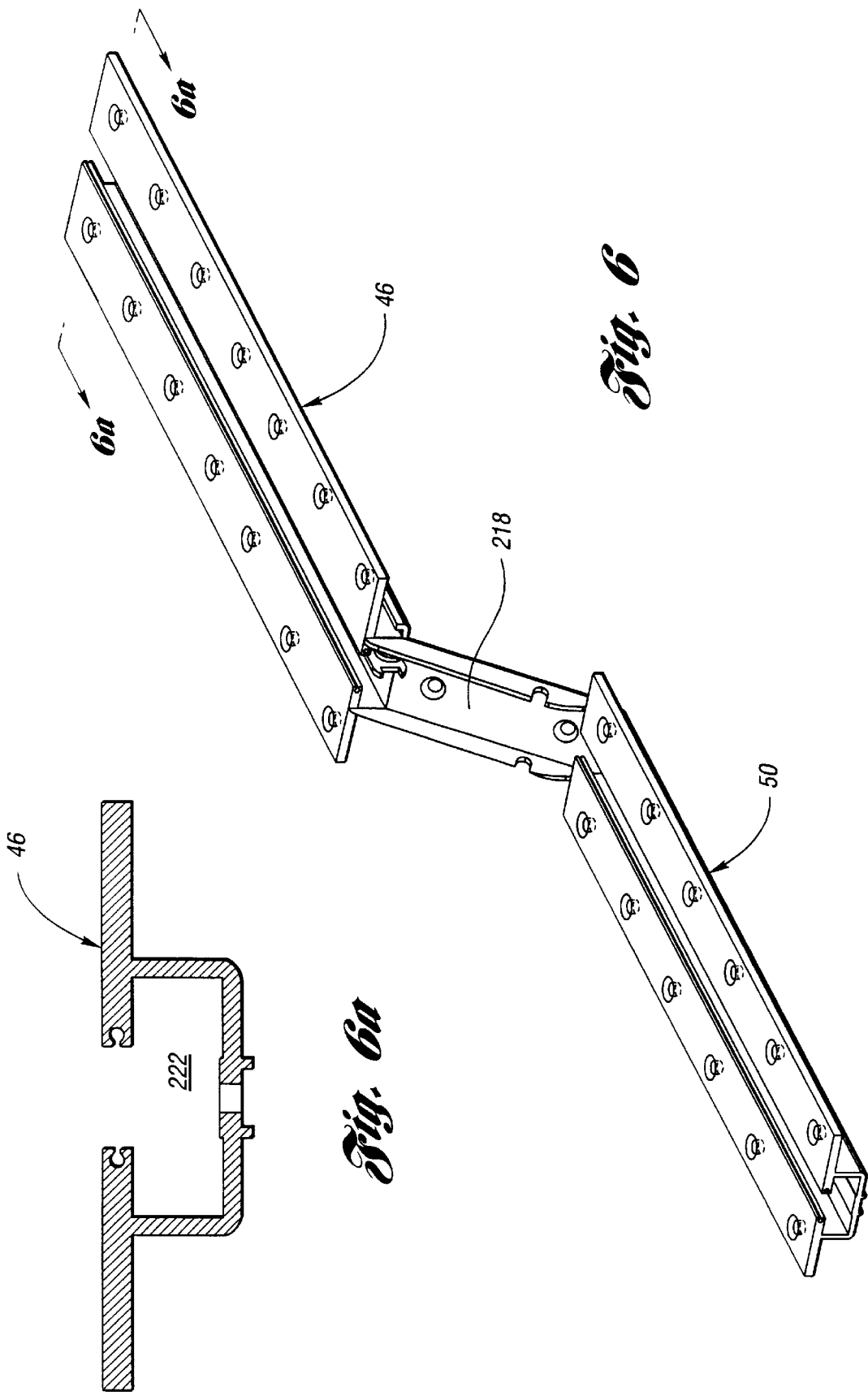

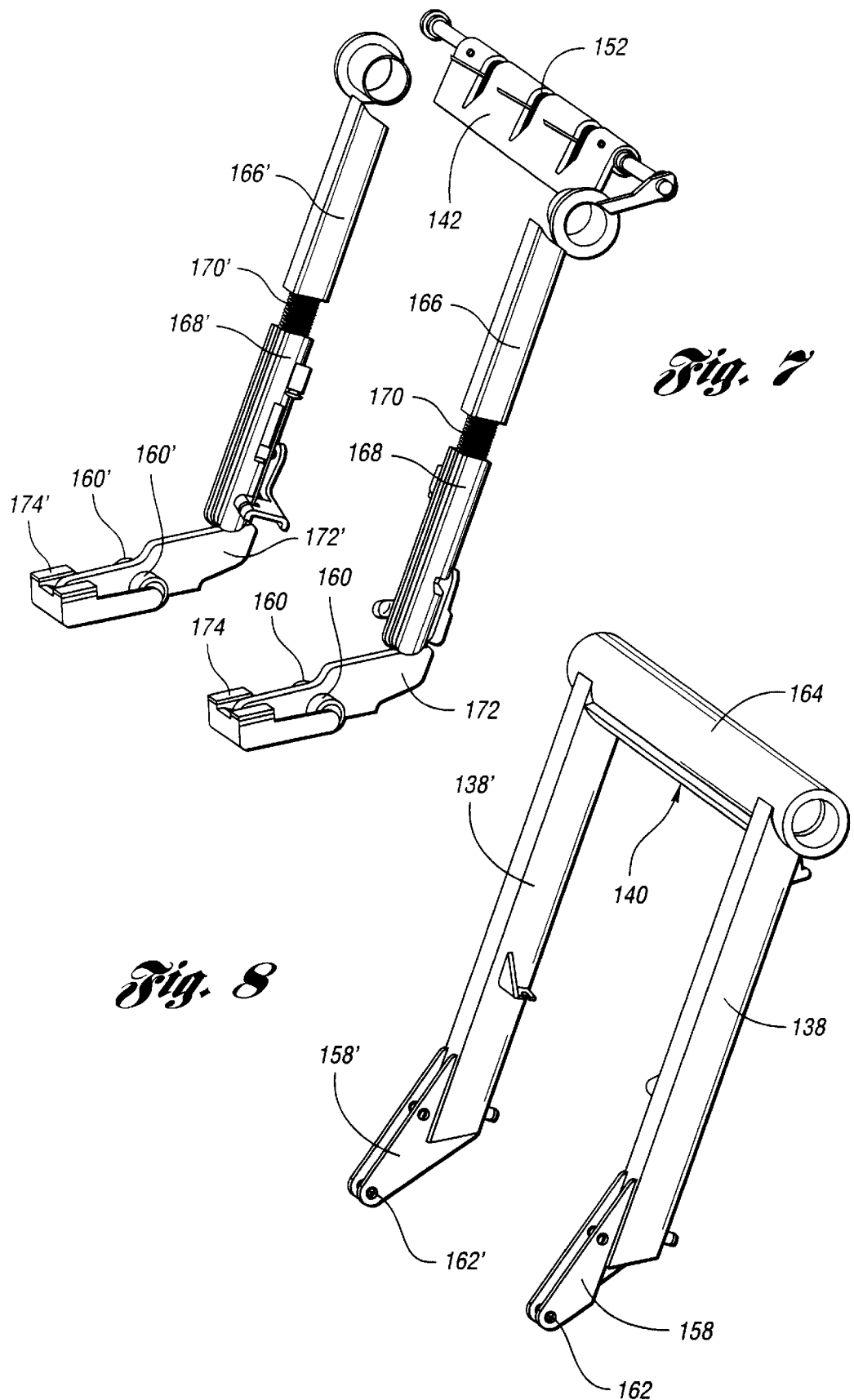

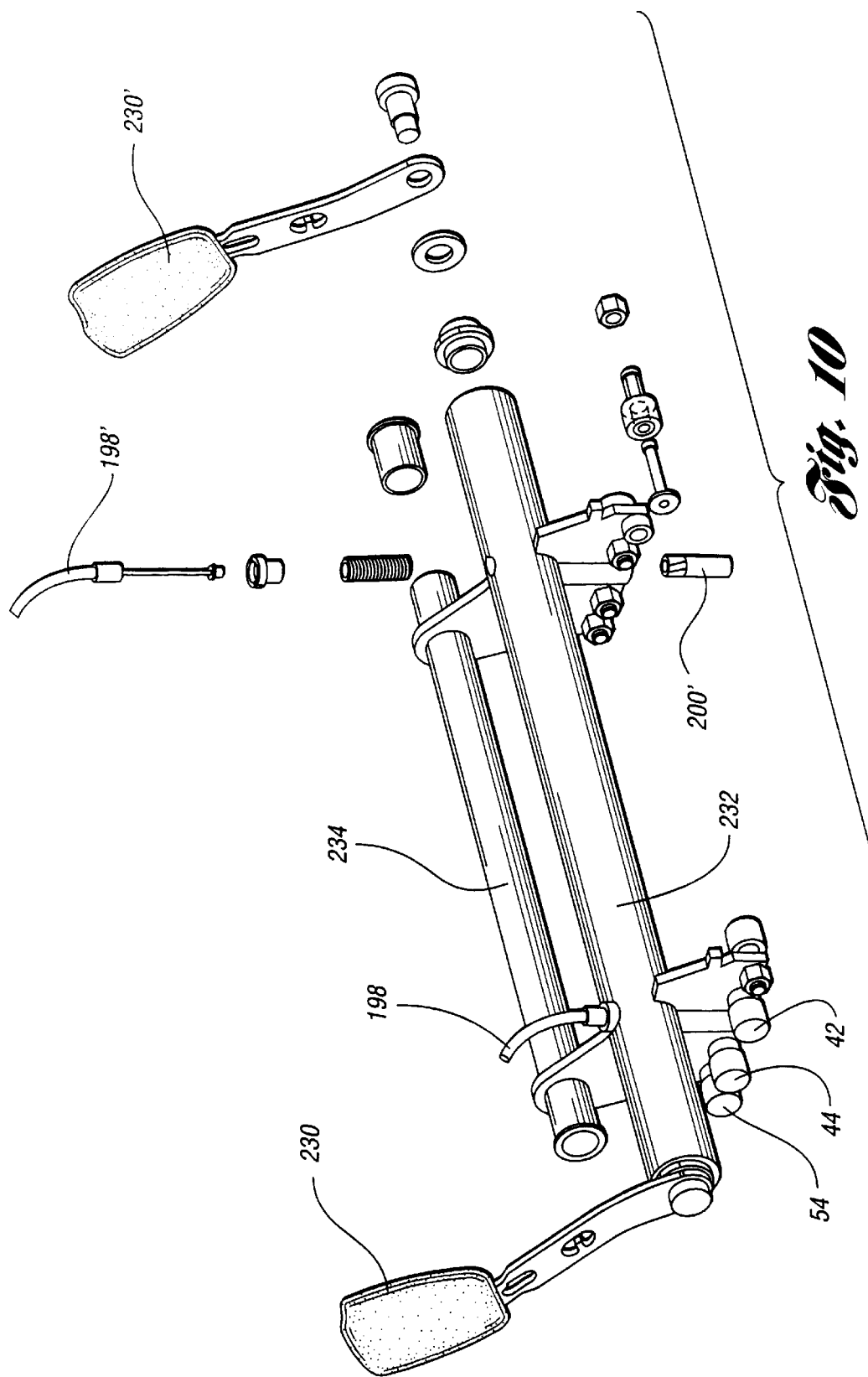

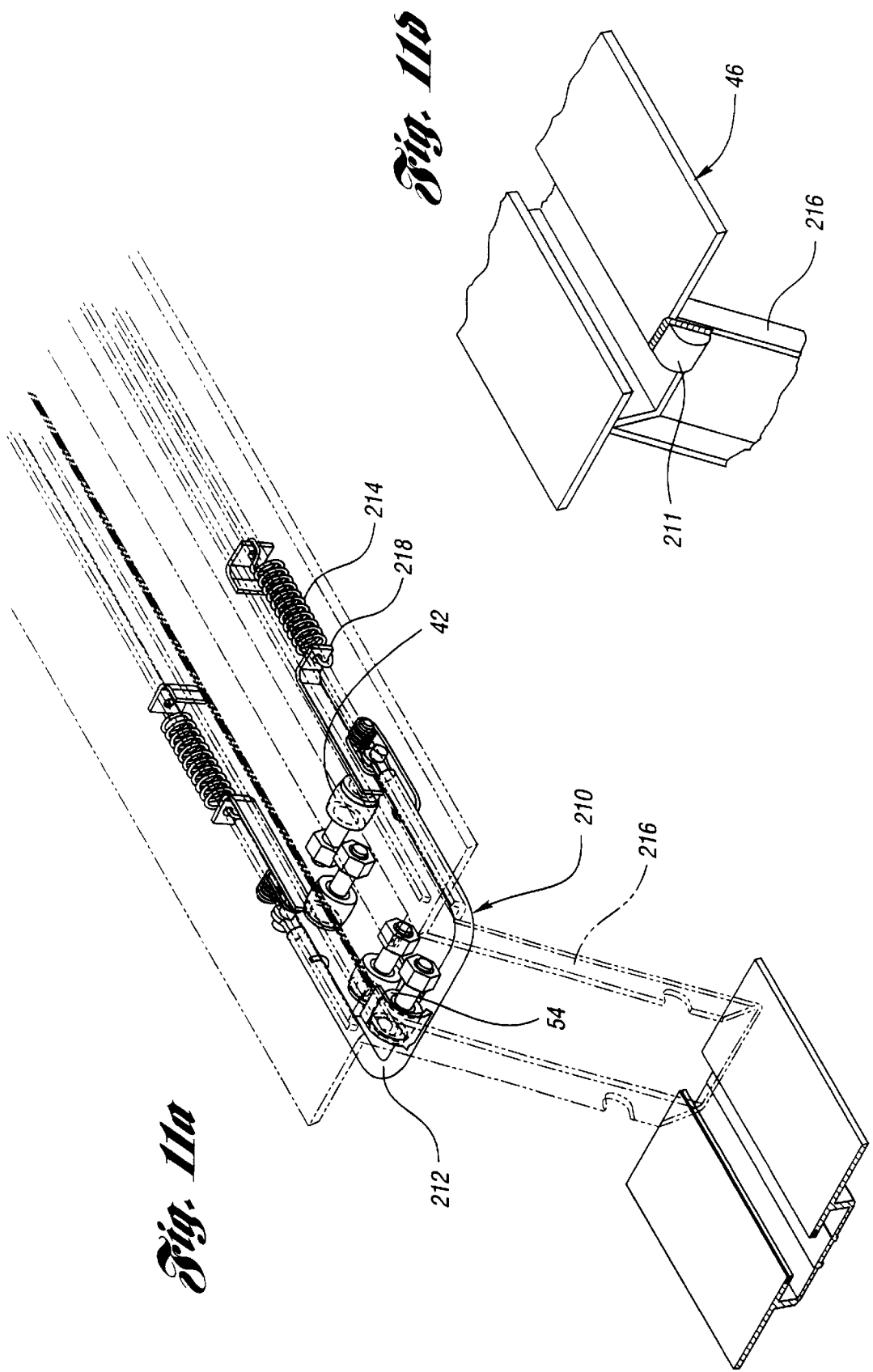

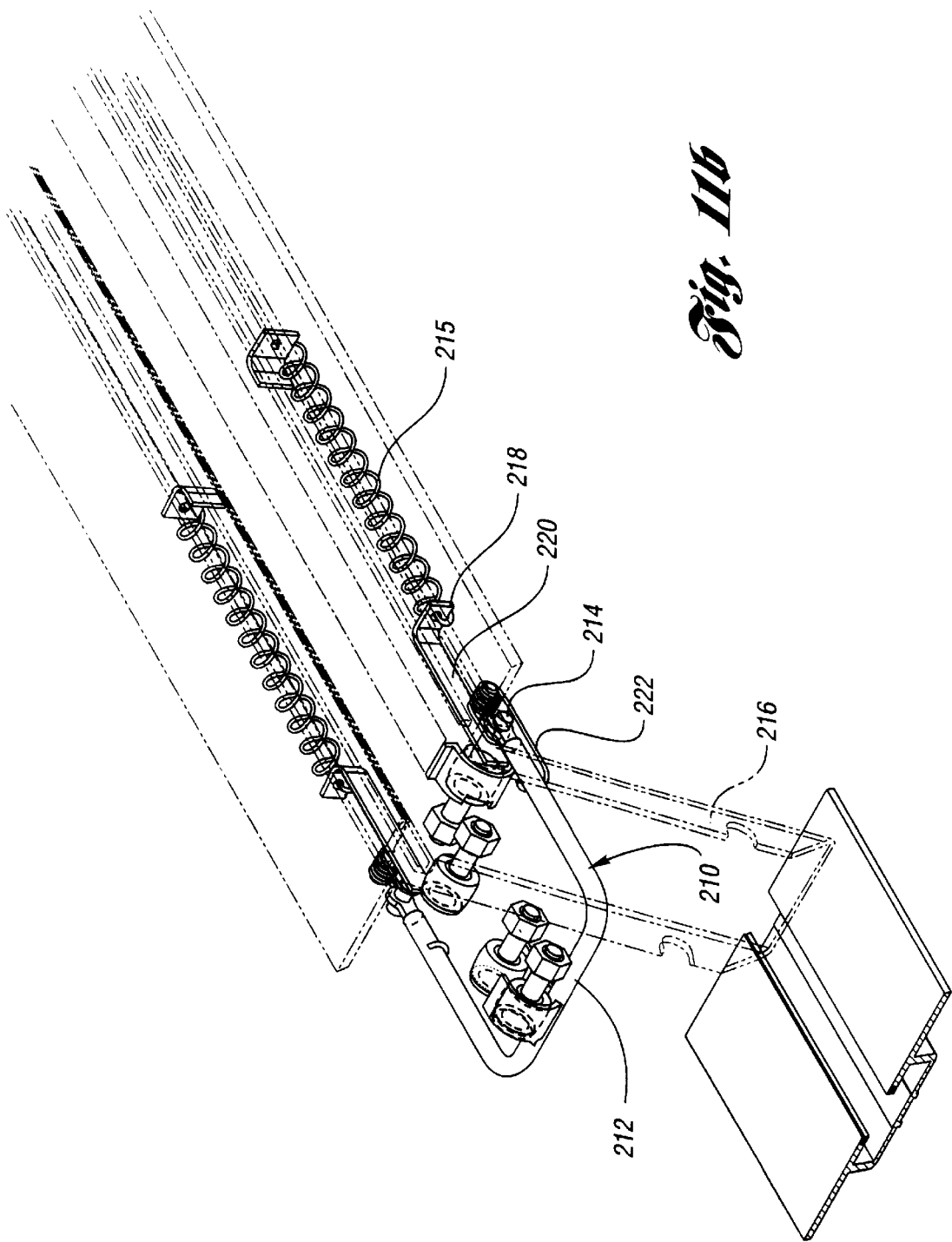

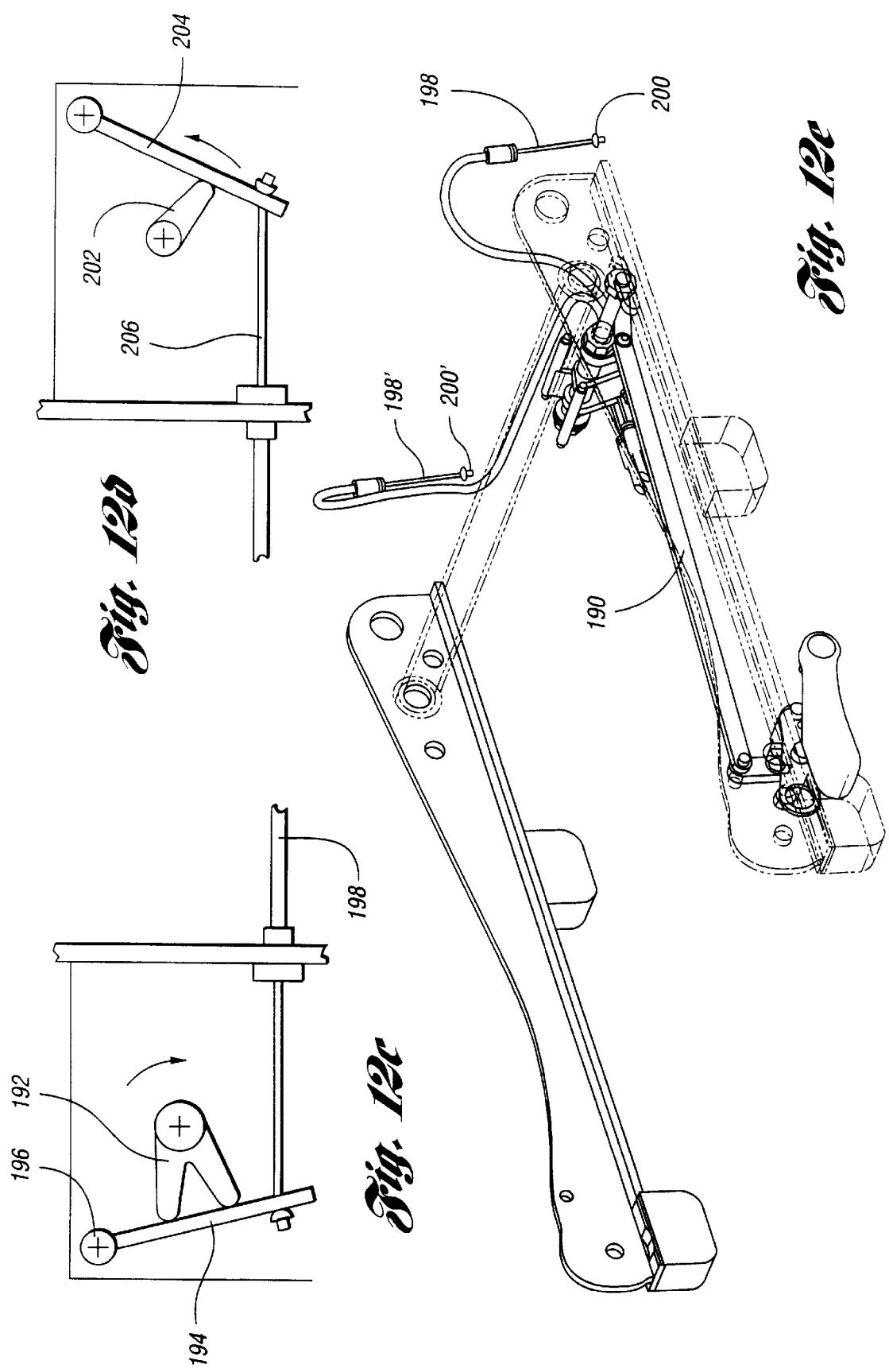

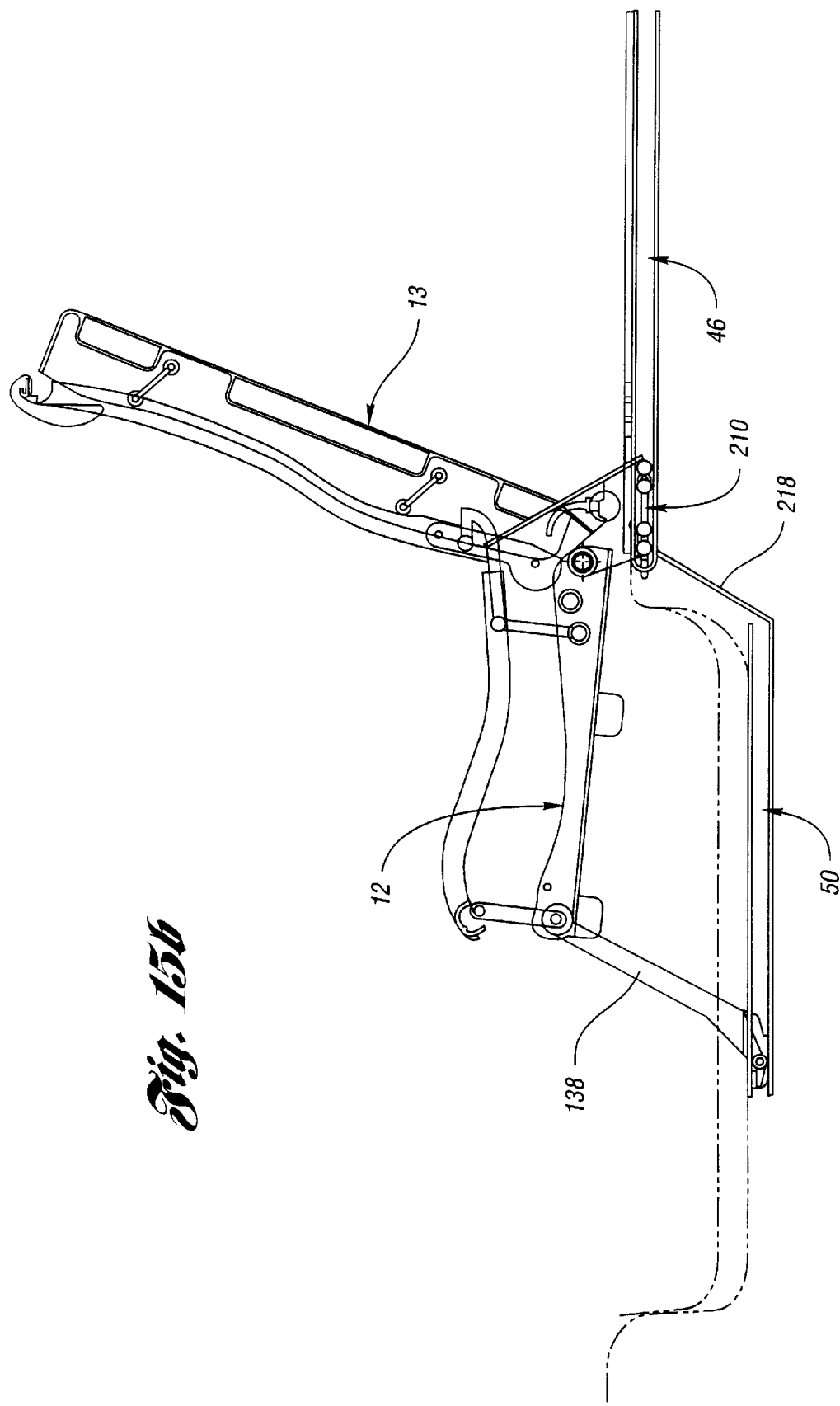

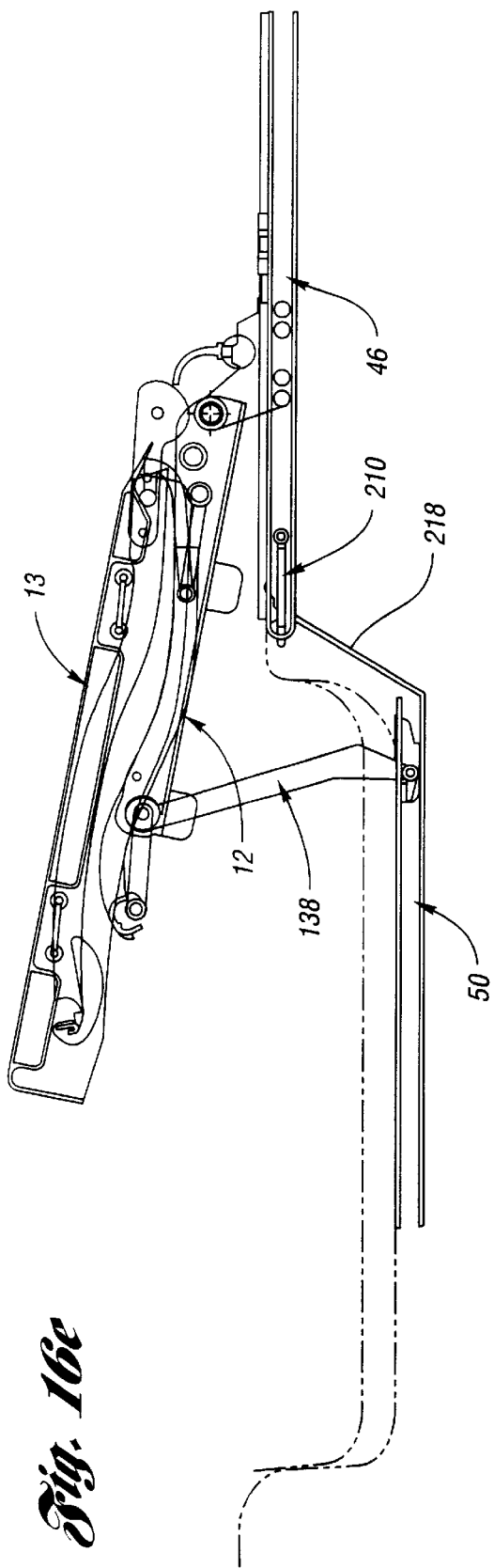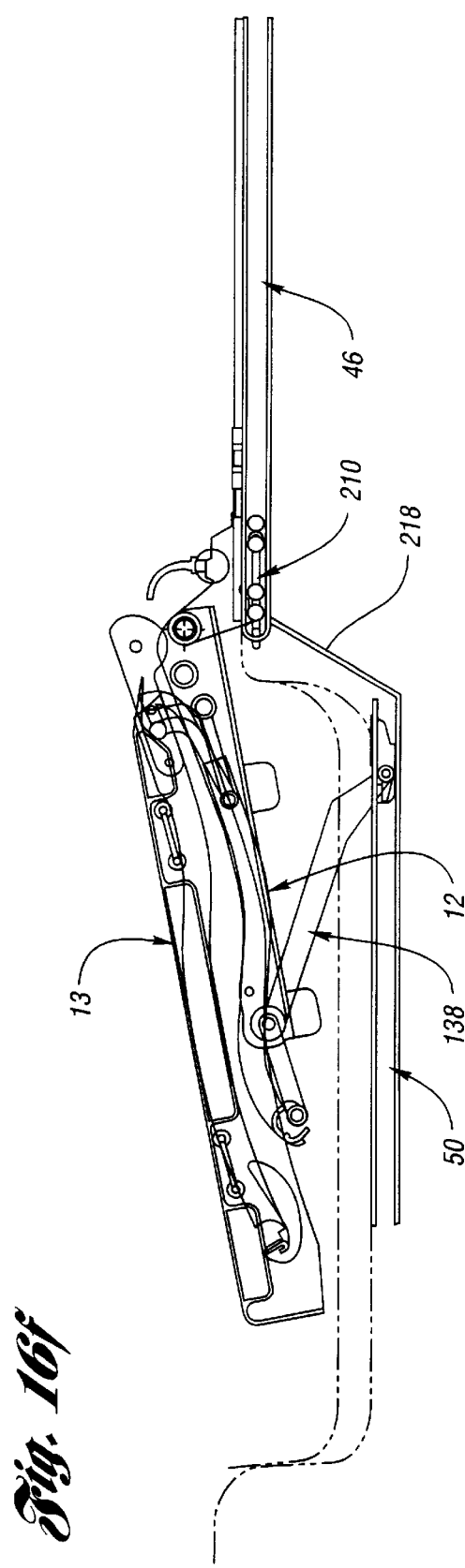

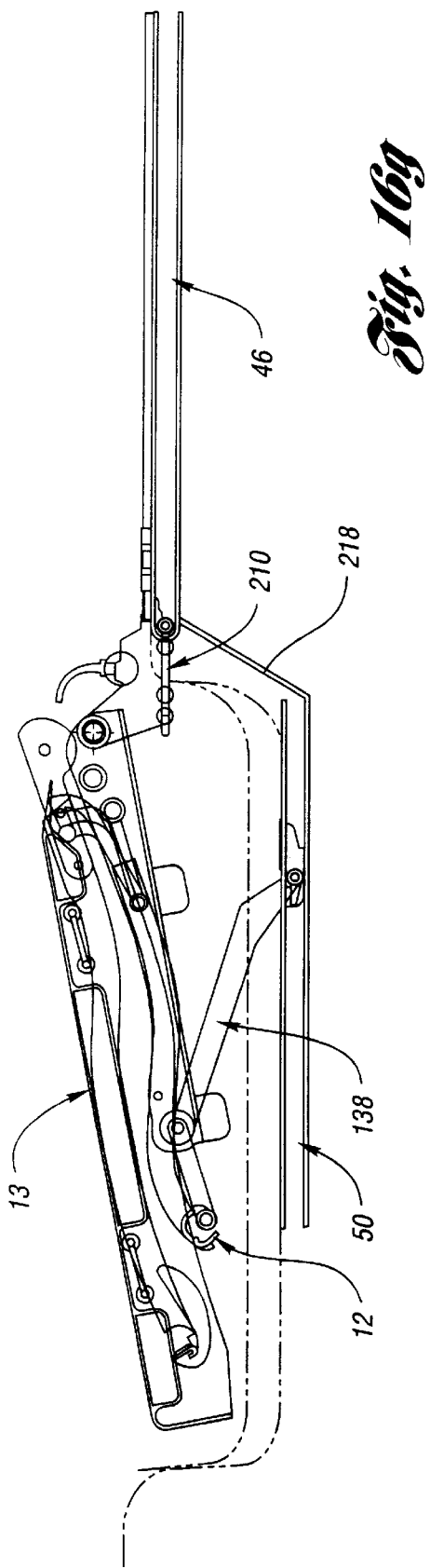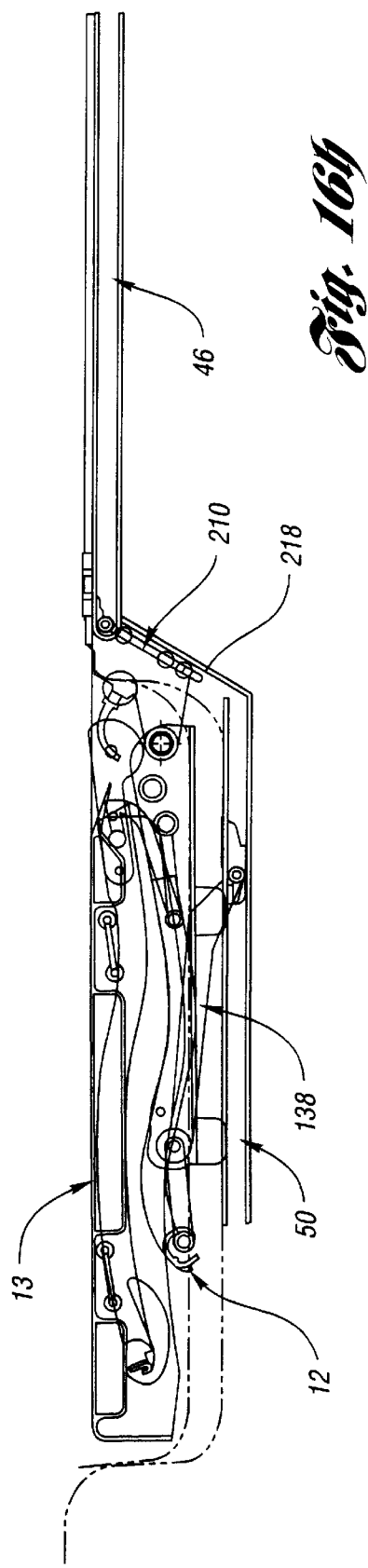

AUTOMOTIVE SEAT ASSEMBLY WITH FOLDING STRUCTURAL SUPPORTS FOR STORAGE IN A FOOT WELL FOR AN AUTOMOTIVE VEHICLE BODY

TECHNICAL FIELD

The invention relates to vehicle seat assemblies for automotive vehicles capable of being adjusted from a passenger-supporting position on a vehicle floor structure to a folded stowed position forward of the passenger-supporting position in a foot well of the vehicle floor structure.

BACKGROUND ART

It is known design practice in the art of automotive body design to provide rearwardly positioned passenger seat assemblies in a vehicle passenger compartment wherein the vehicle floor structure of the vehicle passenger compartment is formed with a bi-level configuration. An upper portion of the floor structure supports a seat frame for the lower seat portion of the automotive seat assembly, the seat frame including a pivotal support for a seat back portion. The seat assembly includes means for adjusting the angular position of the seat back portion relative to the plane of the upper portion of the floor structure. Provision is made for moving the seat back portion forward on its pivot axis so that it overlies the lower seat portion and for shifting the seat assembly forward for storage in the lower foot well portion of the floor structure.

An example of a stowable rear seat assembly of this kind is disclosed in U.S. Pat. No. 5,570,931. Other examples are disclosed in applicants' copending U.S. patent applications, Ser. No. 08/950,934, filed Oct. 15, 1997, now U.S. Pat. No. 5,839,773, issued Nov. 24, 1998, and 08/950,558, filed Oct. 15, 1997. Still another example is disclosed in U.S. patent application Ser. No. 09/250,702, filed Feb. 16, 1999. These copending applications are assigned to the assignee of the present invention, and reference may be made to them for the purpose of supplementing the present disclosure. The subject matter of these copending applications is incorporated herein by reference.

DISCLOSURE OF INVENTION

It is an objective of the invention to provide a foldable rear seat assembly for an automotive vehicle that is adapted to be stored in a foot well located between the normal passenger-supporting position for the rear seat assembly and the forward seat assembly in a vehicle passenger compartment. The rear seat assembly may be locked in place in its normal passenger-supporting position by an anchorage, which may be released or unlocked from the floor structure and shifted forward toward the foot well position with minimal effort on the part of the operator. In contrast to known stowable seat assemblies, the forward portion of the foldable seat assembly of the invention includes forward legs secured to a track located in the foot well at a lower level portion of the floor structure. The rearward portion of the rear seat assembly, furthermore, is mounted on rollers secured in tracks formed in an upper level portion of the floor structure. The tracks run in a fore-and-aft direction.

The forward legs, which support the forward margin of the lower seat portion, include a frictional attachment to the track located in the foot well of the floor structure. The rear legs, which support the rearward margin of the lower seat portion, are equipped with spring-loaded pins, which engage holes in the track.

A manually operated handle at the seat front lower edge, when it is moved in one direction, releases locks at the front leg lower end and at the rear legs for fore-and-aft comfort adjustment. This allows the seat to be moved on rollers in the tracks at the upper level of the floor structure and in the lower foot well of the floor structure. Releasing the handle locks the forward and rearward legs in place. When the handle is moved in the opposite direction with the seat unoccupied, the seat back portion may be folded down over the lower seat portion. This unlocks each front leg upper end, thereby permitting the front legs to be adjusted angularly with respect to the lower seat portion frame. Simultaneously, the rear legs are released, the front leg lower ends acting as pivots at the floor. As the seat is pushed forward, the front margin of the seat follows an arc determined by the length of the front legs.

After partial rotation of the front legs, the front leg lower locks, which secure the lower legs to the track at the foot well, is released. This allows the folded seat assembly to travel forward, further allowing the seat assembly to move downwardly toward its stowed position.

A cushioned, energy-absorbing back panel for the seat back portion of the seat assembly is supported by pivotal links on a seat back frame. As the seat back portion folds over the lower seat portion, a cable arrangement causes the pivotal links to rotate to a collapsed position, thereby reducing the effective thickness of the seat back portion when the seat assembly is stowed.

As the rear legs reach the front of the track at the upper level portion of the floor structure, they engage guides as the lower seat portion is rotated downwardly into the lower foot well portion of the floor structure. This assists in bringing the rear legs to the correct angle for entry into the track when the seat is raised to its upright position.

Each rear leg is locked by a spring-loaded pin when the seat assembly is in its normal passenger-supporting position. The lower end of each front leg at that time is locked to the track in the lower foot well portion of the floor structure by a friction device. The friction device is actuated and released by a plunger located inside the forward leg. The friction device is deactivated when the seat is moved to its stowed position in the lower foot well portion of the floor structure.

A spring located inside of the front leg upper pivot acts to counterbalance the seat weight as it travels to the stowed position and assists the operator as the operator moves the stowed seat to its raised position.

BRIEF DESCRIPTION OF DRAWINGS

FIG. 4 is a subassembly view of the front legs of the seat assembly of FIGS. 1, 2 and 3, including a push block located in each forward leg of the seat assembly, the push block actuating a pivoted friction shoe that secures the lower end of the forward legs to a fore-and-aft track in the lower foot well of the floor structure;

FIG. 5 is a partial assembly view in schematic form showing an adjustable lock mechanism that determines the angular position of the seat back portion of the seat assembly relative to the lower seat portion;

FIGS. 6 and 6a show details of the track that supports the seat assembly, FIG. 6a being a sectional view taken along the plane of section line 6a—6a of FIG. 6;

FIG. 7 is a partial assembly view in schematic form showing the friction brake locking mechanism in the forward legs of the seat assembly;

FIG. 8 is the outer tubular structure that contains the leg assembly elements of FIG. 7;

FIG. 10 is a partial isometric assembly view showing the rear roller assembly for the stowable seat of the invention;

FIGS. 11a, 11b and 11c show an isometric subassembly view of the rear roller assembly as it traverses the seat-supporting track toward the foot well in which the seat assembly can be stored;

FIG. 11d is a partial perspective view of a stop for the track rollers as they move to the forward end of the track;

FIG. 12c is a schematic representation of a side view of a cam and camshaft in combination with the cable operator mechanism shown in FIG. 12b;

FIG. 12d is a schematic illustration of a cam operator and cable assembly for releasing the front legs as part of a fore-and-aft adjustment procedure;

FIG. 13b is a cross-sectional view as seen from the plane of section line 13b—13b of FIG. 13a;

FIG. 13c is a cross-sectional view as seen from the plane of section line 13c—13c of FIG. 13a;

FIG. 13d is a cross-sectional view of the lower seat portion showing a typical application of suspension and cushion materials as seen from the plane of section line 13d—13d of FIG. 14;

FIG. 14 is an isometric view of a seat back frame for the seat back illustrated in FIG. 13a;

FIGS. 15a and 15b show a rearward position and a forward position, respectively, for the seat assembly of the invention as it is adjusted in a fore-and-aft direction; and FIGS. 16a–16h show the seat assembly of the invention at various stages of the folding and storage procedure.

BEST MODE FOR CARRYING OUT THE INVENTION

Figure 1:
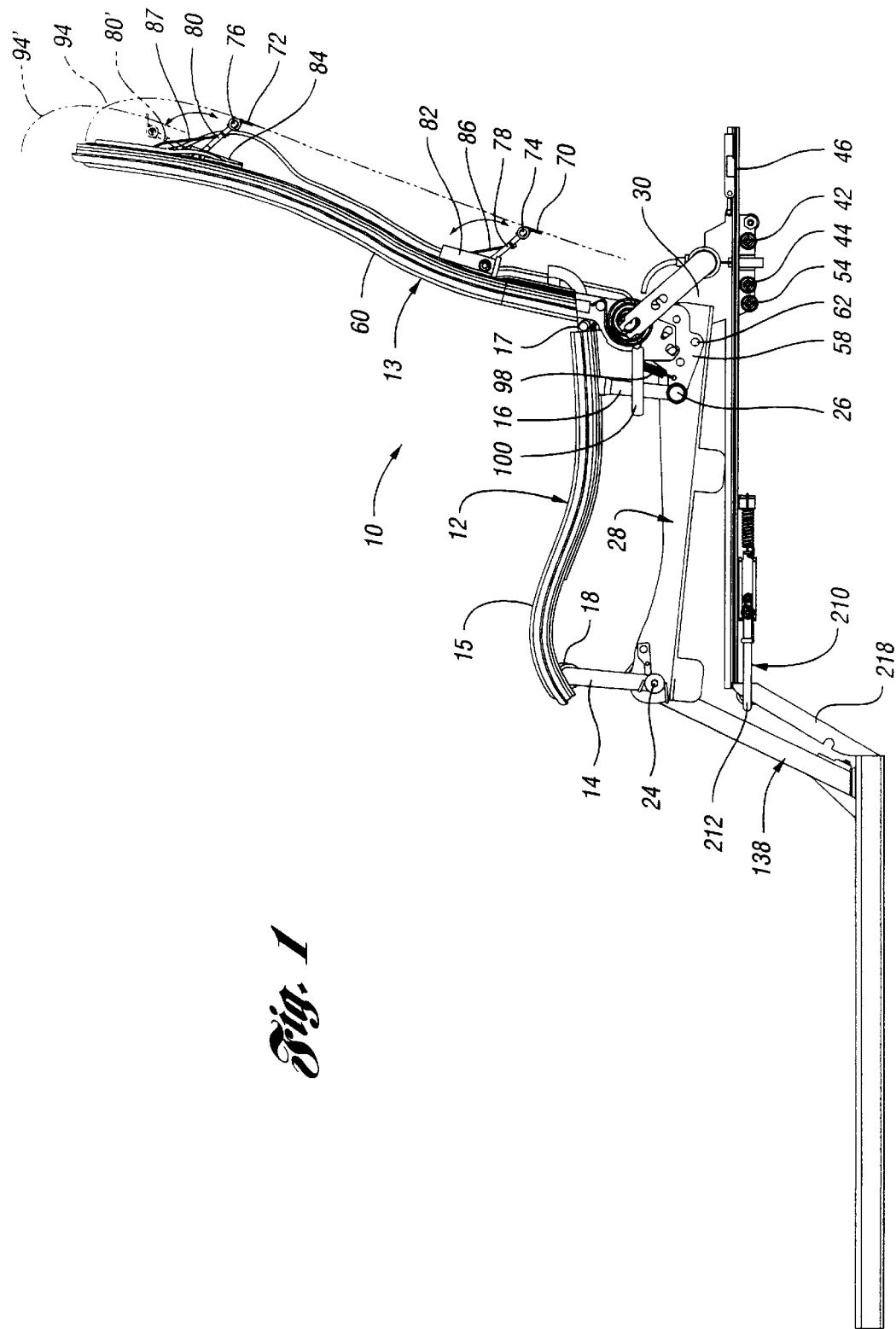
FIG. 1 is a side elevation view of a stowable rear seat assembly embodying features of the invention.
Figure 2:
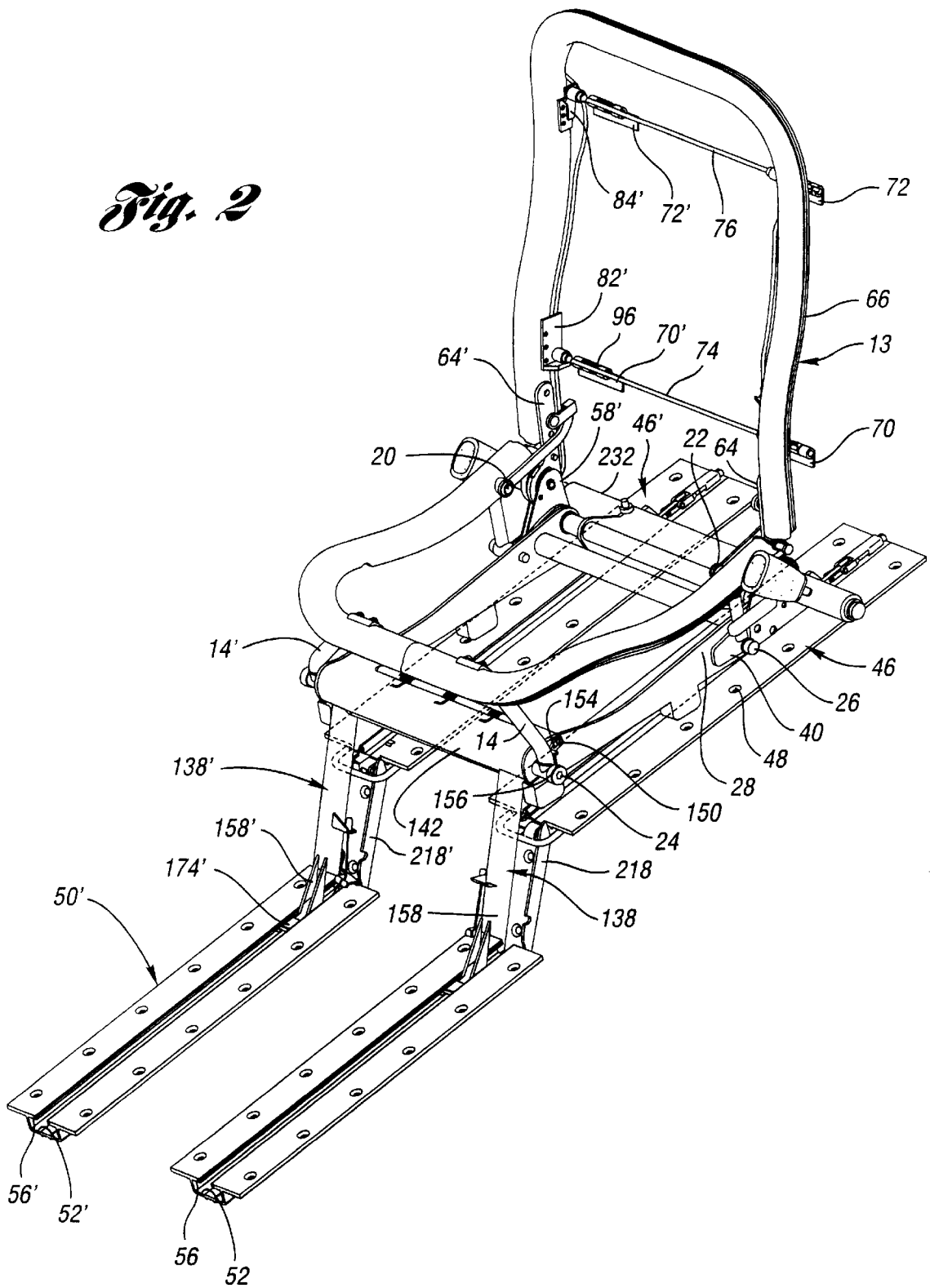
FIG. 2 is an isometric assembly view of the seat assembly of FIG. 1.
Figure 3:
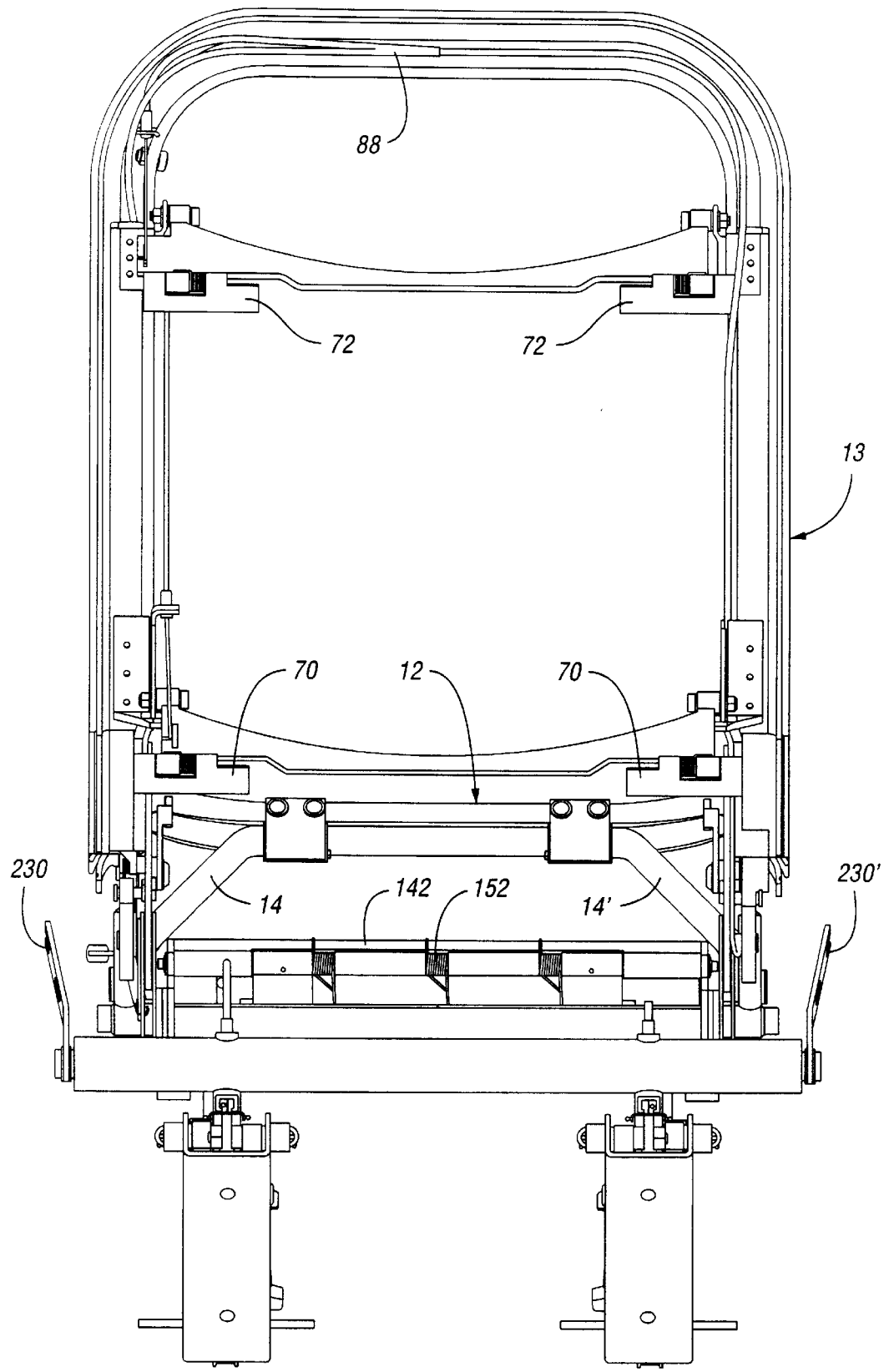
FIG. 3 is a rear view of the seat assembly of FIG. 1.

FIG. 1 is a side elevation view of the seat assembly of the invention, which is designated by reference numeral 10. The assembly includes a lower seat portion 12 and an upright seat back portion 13. The lower seat portion 12 includes a cushion support 15 which is supported by forward links 14 and rearward links 16. The upper ends of the links 14 and 16 are pivoted at the forward margin of the cushion support 15, as seen at 18, and the upper ends of the rear links 16 are pivoted near the rearward margin of the cushion support. This is seen in FIG. 2 at 20 and 22, which is an isometric view of the seat assembly shown in the side elevation view of FIG. 1.

The lower ends of the forward links 14 and the lower ends of the rearward links 16 are pivoted at 24 and 26, respectively, to a lower seat frame 28.

A rear support 30 is situated directly adjacent the frame 28 to form a support for the pivot 26.

Rollers 42 and 44 are rotatably journalled on the support 30, as best seen in FIG. 1. The rollers 42 and 44 engage the upper surface of a track 46, which may be secured by bolts extending through bolt holes 48 to the vehicle floor structure, not illustrated.

The foot well of the floor structure is located at a level that is lower than the level of track 46. The foot well tracks are illustrated at 50 and 50' in FIG. 2. The track 50, which corresponds to track 46, includes a lower surface 52 corresponding to the previously mentioned lower surface of the track 46. Lower surface 52 is engaged by rollers 54, as seen in FIG. 1. Track 50 further includes an upper surface 56 which is engaged by the rollers 42 and 44. The upper surface 56 corresponds to the previously described upper surface of the track 46.

A track at the right side of the seat assembly also is illustrated in FIG. 2. It is a duplicate of the track 50 and is designated by the reference numeral 50'. Upper and lower track surfaces 52' and 56' correspond, respectively, to the surfaces 52 and 56 for track 50. The upper seat back portion 13 is pivoted on pivot bracket 58 at the left side of the seat assembly and by a corresponding pivot bracket 58' on the right side of the seat assembly. The brackets are bolted to the lower seat frame 28 at locations 26 and 62, seen best in FIG. 1.

The seat back portion of the seat assembly includes support brackets 64 and 64' at the left side and the right side, respectively, as seen best in FIG. 2. A seat back frame 66 of generally U-shape is secured to support brackets 64 and 64'. A frame 66 is formed so that it conforms generally to the spinal curve of the seat occupant, as best observed in FIG. 1.

Figure 13A:
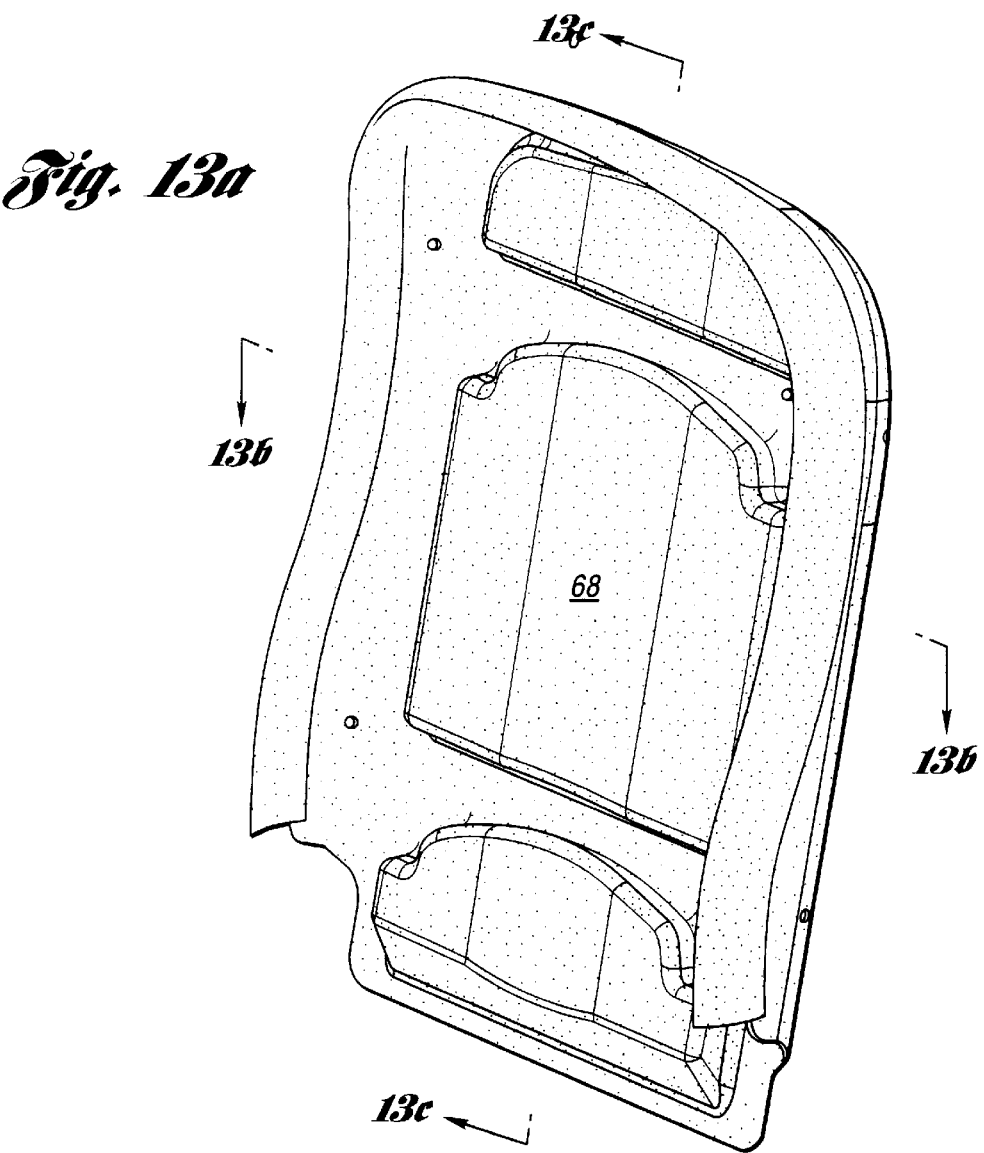
FIG. 13a is an isometric view of the front of the seat back portion of the seat assembly.
Figure 13B:
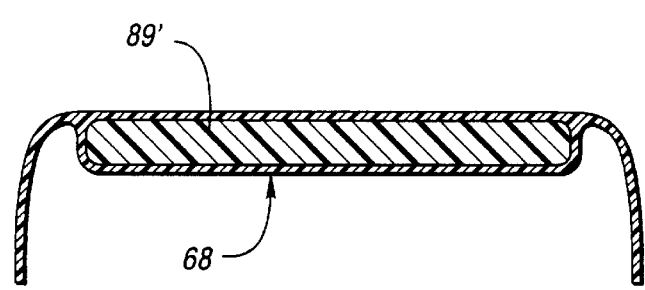
Figure 13C:
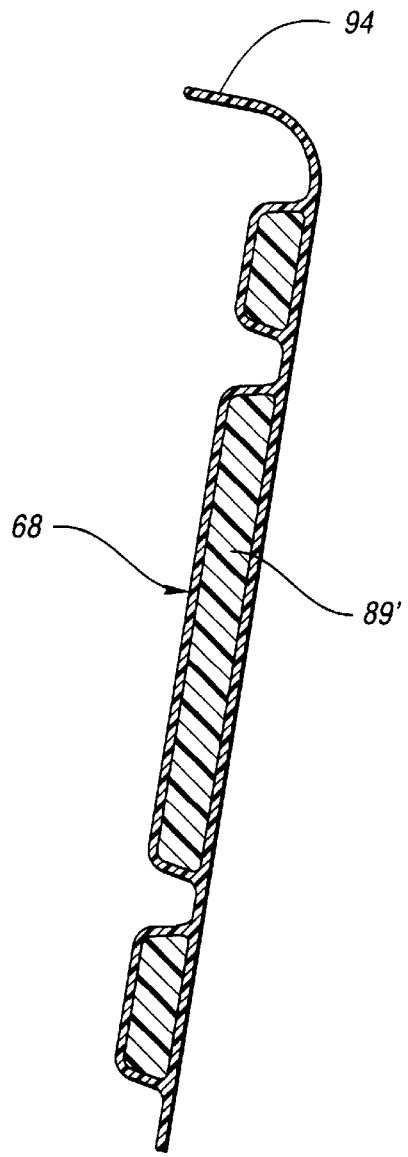
Figure 13B:
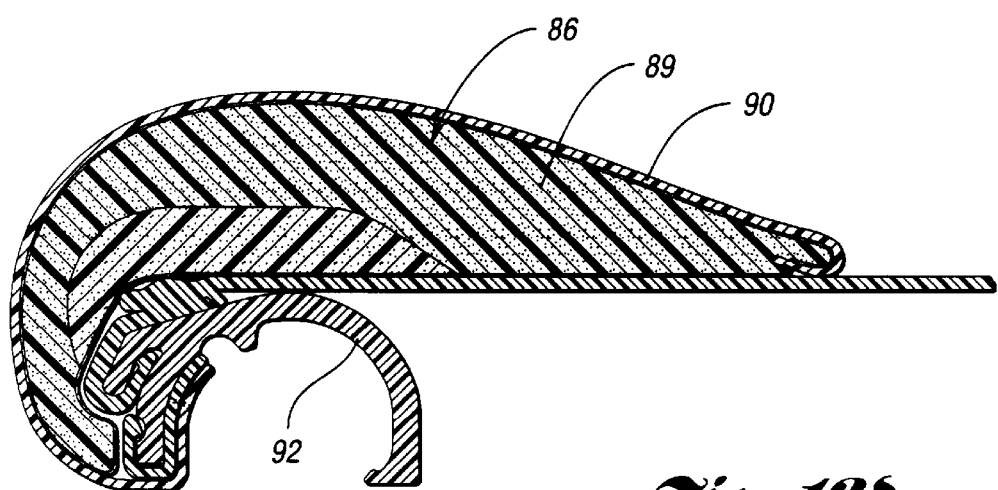

A rigid panel, which, in the upright position, provides energy absorption in the event of an impact, is shown in FIGS. 13a–13c at 68. In the stowed position, it provides a load floor. It is secured by mounting plates 70 and 72, as seen in FIG. 1. These mounting plates are pivotally mounted on cross-rods 74 and 76, respectively. The cross-rods 74 and 76 pivotally connect the support plates 70 and 72 to rotatable links 78 and 80, as seen in FIG. 1. The ends of the links 78 and 80 are secured to the seat back frame 66 by brackets 82 and 82' at a lower location for the seat back portion and by brackets 84 and 84' at an upper location of the seat back portion.

FIG. 13d shows a cushion 86, which comprises a suitable foam material such as polyurethane, as seen at 89. This is surrounded by covers such as a vinyl cover shown at 90. The cushion 86 is secured to the seat frame by a retainer element 92, which partially encircles the seat frame.

Figure 14:
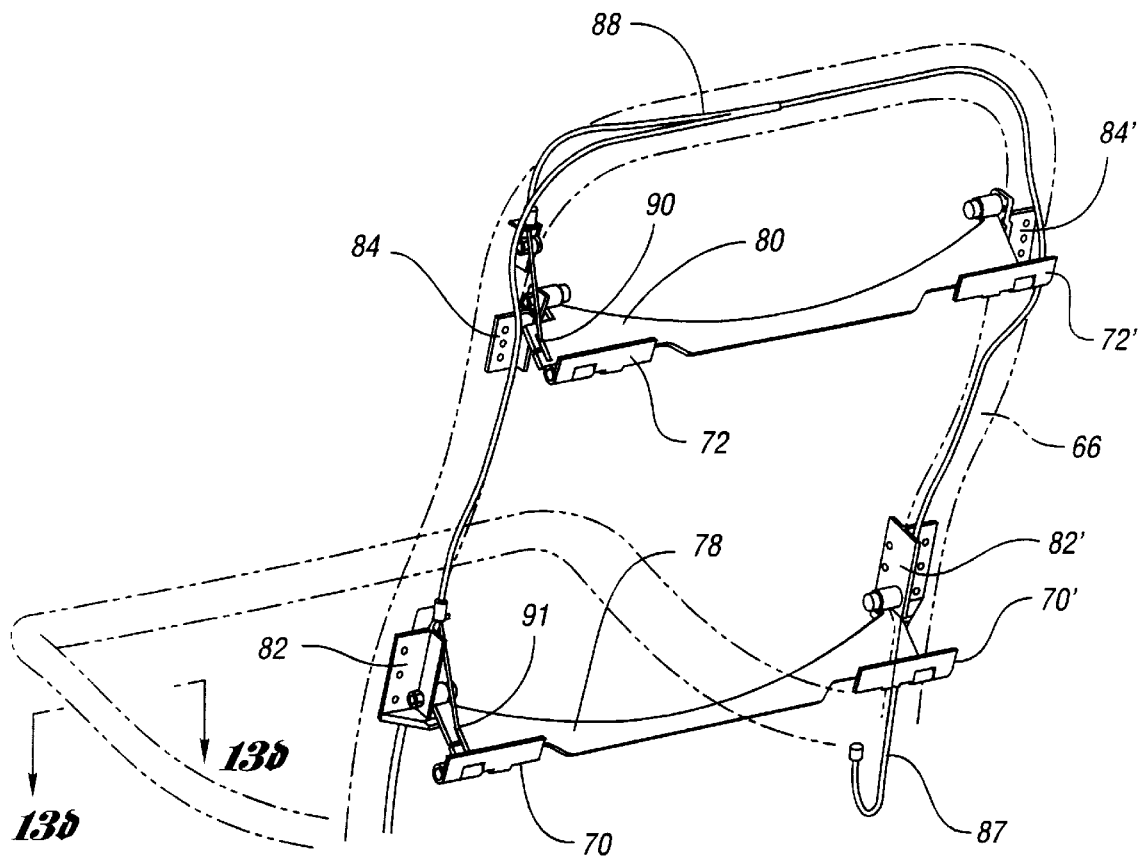

As best seen in FIGS. 1 and 14, a cable 87 is joined to each of the links 78 and 80. It is anchored to the lower seat frame 28 and trained over the seat back frame 66, as best seen in FIG. 14. The cable 87 is bifurcated at 88, one end of the bifurcation being connected at 90 to the link 80, and the other end being secured at 91 to the link 78.

When the seat back portion is pivoted over the lower seat portion, the cushioned panel is moved upwardly as the links 78 and 80 pivot in a counterclockwise direction, as viewed in FIG. 1. As the seat back portion pivots in a counterclockwise direction, as viewed in FIG. 1, the upper margin 94 of the back panel will extend forward. This is seen best by referring to FIG. 1 where the reference numeral 80' indicates the position of the link 80 as it is moved by the cable 87 when the seat back portion is folded over the lower seat portion. The upper end of the seat back panel assumes the position shown at 94' when the seat back portion is folded forward over the lower seat portion. This feature eliminates or reduces a gap between the folded seat assembly and the forward margin of the seat well when the seat assembly is in its stowed position. This will be apparent subsequently from the description of the folding and stowage sequence that will be described with reference to FIGS. 16*a*–16*h*.

FIG. 13*b* shows the shape of the cushioned back panel at an intermediate location of the seat back assembly seen in FIG. 13*a*. FIG. 13*b* is a cross-sectional view of the cushioned back panel at the upper sides of the seat back frame. The cushion material seen in FIG. 13*b* at 89', seen in FIG. 13*d*, is a relatively rigid structural plastic.

When the seat back portion is folded over the lower seat portion, the cushion support 15, which is connected at 17 to the lower part of the seat back portion, will move forward, thereby moving the links 14 and 16 counterclockwise to their stacked positions, seen in FIGS. 16*c*–16*h*. The links 14 and 16 essentially form opposite sides of a collapsible parallelogram.

The support plates 70 and 70' and the support plates 72 and 72', seen in FIG. 2, include torsion springs 96 that are arranged to provide counterclockwise torque on the links 78 and 80, seen in FIG. 1, so they will move from the position shown in FIG. 78 to a position corresponding to the position of link 80' when the seat back portion is folded. The position of the links 78 and 80 is not perpendicular with respect to the center plane of the seat back portion when the seat is occupied by a passenger. Thus rear impact forces on the cushioned back panel will not be transmitted directly to the seat back portion. Rather, the forces will be cushioned by the cushion material described with reference to FIGS. 13*a*–13*d*.

As seen in FIGS. 1, 2 and 8, a lever 96 is rotatably mounted on the support bracket 58 so that it pivots about pivot shaft 98, which is the pivot shaft for the support frame for the seat back portion. The lever 96 is biased in the counterclockwise direction, as viewed in FIG. 8, by a tension spring 98 secured at one end to the support bracket 58 and at the other end to the lever 96. A recliner handle 100, which forms a part of the lever at 96, permits the operator to move the lever in a clockwise direction, as viewed in FIG. 5, when the operator wishes to adjust the angular position of the seat back portion.

The lever 96 has an opening or a window 102 which receives an adjustable pin 104 carried by a cam 106, the latter being pivoted on the bracket 58 by pivot shaft 108. The pin 104 extends through the opening 102. When the lever 96 is moved in a clockwise direction as the operator pulls the handle 100, the pin will be engaged by the end of the opening 102, thereby shifting the cam 106 out of engagement with a cam follower surface 110 on a pawl 112.

When the lever 96 is in its normal operating position, as shown in FIG. 5, the opposite end of the window or opening 102 engages the pin 104 to move the cam 106 so that it locks the pawl 112 in the position shown in FIG. 5 as the end of the cam 106 engages the cam follower surface 110.

The pawl 112 has locking teeth 114, which engage corresponding locking teeth formed in the periphery 116 of the bracket 64. The pawl 112 is pivotally mounted on pivot shaft 118, which is supported by the bracket 58.

The lever 96 has a second cam opening 120, as seen in FIG. 5, which engages an adjustable pin 122. Pin 122 is mounted in the opening 120 and in a slot 124 formed in the pawl 112. Thus when the handle 100 is pulled by the operator in a clockwise direction, the cammed opening 124 will lift the pawl teeth 114 out of engagement with the teeth of the bracket 64. This occurs as the cam 106 is moved out of engagement with respect to the cam follower surface 110. The angle of the bracket 64 can be adjusted through any of a variety of angular positions relative to the lower seat portion whenever the teeth on the pawl 114 are out of engagement with the corresponding teeth of the lever 64.

If the upper seat portion is adjusted to its extreme position over the lower seat portion, the pawl teeth 114 will engage a notch 126 in the periphery 116 of the bracket 64. This will lock the upper seat portion in its fully stowed position over the lower seat portion.

A coil spring 128, which is anchored to the bracket 64 at 130, imparts a counterclockwise moment to the bracket 64, thereby assisting in angularly adjusting the upper seat back portion. The opposite end 132 of the coil spring 128 is anchored to the pivot shaft 98.

The bracket 64 may be formed with an arcuate slot 134, which receives a pin 136 supported by the stationary bracket 158. The arcuate extent of the slot 134 limits the angular movement of the bracket 64 so that the seat back portion cannot be moved rearwardly relative to the lower seat portion to an unacceptable relative angular position. Two front leg assemblies 138 and 138', seen in FIGS. 1 and 2, are pivoted at their upper ends on the pivot shaft 24 to which the legs 14 and 14' are pivoted. The upper ends of the front leg assembles are joined together by cross-member 140 so that they move in unison as part of an integral assembly. A cross-member 142 surrounding the member 140 is a part of the frame 28 for the lower seat assembly.

Figure 9A:
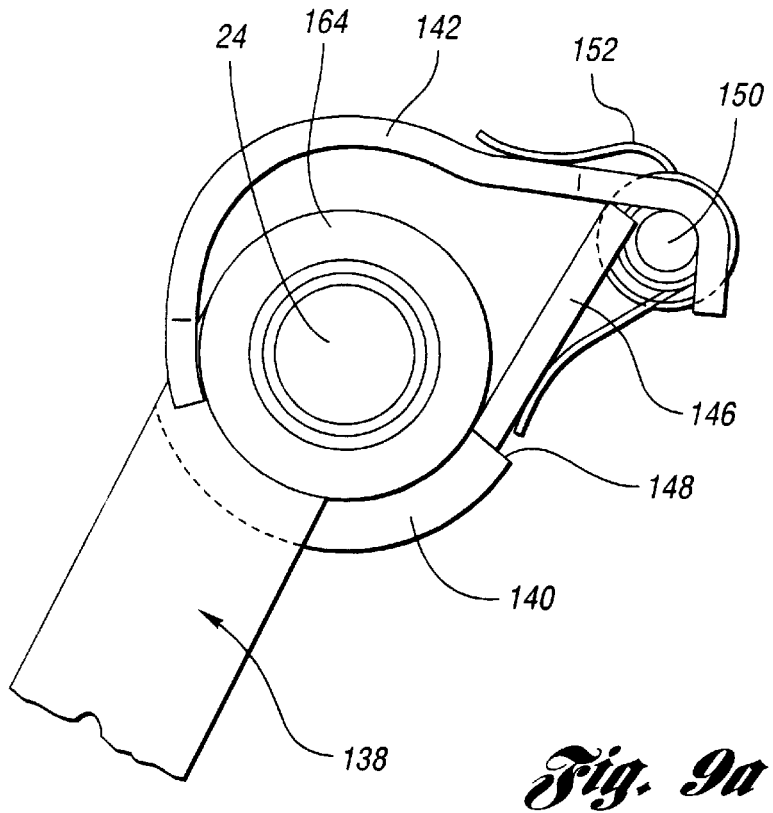
FIGS. 9A and 9B are partial cross-sectional views of the front pivot and lock bar assembly for the upper end, the front legs being shown in FIGS. 7 and 8.
Figure 9B:
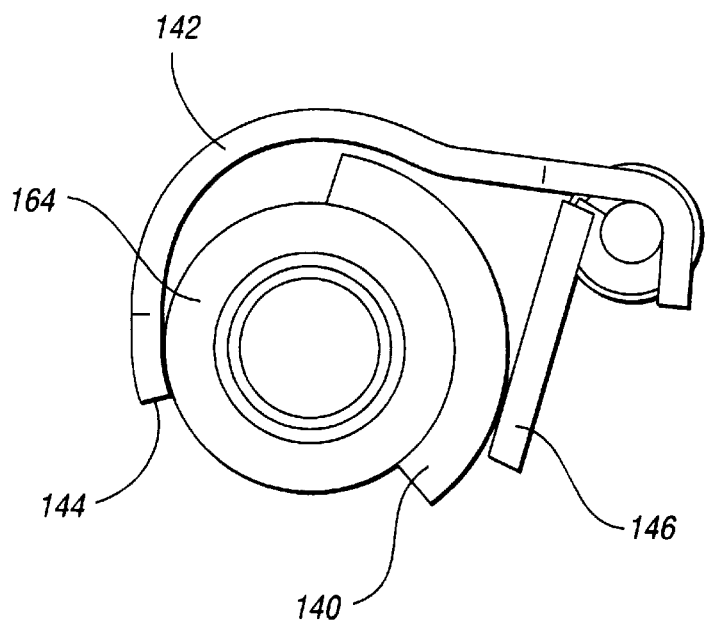

The member 140, as best seen in FIGS. 9*a* and 9*b*, engages a side 144 of the cross-member 142 when the leg assembly 138 is in the position shown in FIG. 9*a*. That position is a normal operating position of the seat assembly when it is occupied. The member 140 is engaged by a lock bar 146, as seen in FIGS. 9*a* and 9*b*, which extends between the end 148 of the member 140 and the stationary member 142, which is part of the frame for the lower seat portion. The lock bar 148 is connected directly to the pivot shaft 150. A torsion spring 152, as seen in FIGS. 9*a* and 9*b*, surrounds the shaft 150 and tends to shift the lock bar 146 toward the position as shown in FIG. 9*a*, which causes the front leg assembly 138 to be locked in position relative to the lower seat frame 28. A release lever 154 joined to the shaft 150, as seen in FIG. 2, is engaged by the frame 66 for the upright seat back portion 13 when the seat back portion is pivoted to its folded position over the lower seat portion. The release lever 154 has a lateral extension element 156, which is engaged by the frame 66 when the upper seat portion is folded, thereby causing the release lever 154 to rotate in a counterclockwise direction as viewed in FIG. 2. When the seat back portion is folded forward, the lever 154 will be rotated, thereby causing the lock bar 146 to move out of contact with the end 148 of the cross member 140. This permits the forward leg assemblies 138 and 138' to pivot about the shaft 74.

The lower ends of the leg assemblies 138 and 138' act as pivot points. They are joined by means of angle brackets 158 to pivot pins on which rollers 160 and 160' are journalled. The pivot shaft extends through openings 162 and 162' in the brackets 158 and 158', respectively, as seen in FIG. 8.

FIGS. 7 and 8 show the details of the front leg assemblies. The housing for the front leg assemblies is illustrated in FIG. 8. The portions of the leg assemblies illustrated in FIG. 7 fit within the housing shown in FIG. 8. The upper ends of the housings for the leg assemblies 138 and 138' are secured to cross-member 164, which is pivoted on shaft 24.

The portion of the leg assembly shown in FIG. 7 includes spacers 166 and 166'. A movable block is located in each housing for the leg assemblies as indicated at 168 and 168'. The blocks 168 and 168' are urged in a downward direction as viewed in FIG. 7 by compression springs 170 and 170'. The lower ends of the blocks 168 and 168' engage the rearward ends of adjustable shoes 172 and 172' which are pivoted on the rollers 160 and 160'. The opposite ends of the shoes 172 and 172' carry friction pads 174 an 174', which are engageable with the surfaces 56 and 56' on the tracks 50 and 50', respectively, located in the foot well. The springs 170 and 170', when they are positioned as shown in FIG. 7, tilt the shoes 172 and 172' so that the friction pads will engage the surfaces 56 and 56', thereby locking the front leg assemblies 138 an 138' against shifting movement in a fore-and-aft direction along the tracks 50 and 50'. The rollers 160 an 160' are engageable with the surfaces 52 and 52' of the tracks 50 and 50'.

FIG. 4 is a schematic representation of the release lever for unlocking the lower ends of the front leg assemblies 138 and 138'. The block 168 has a pair of slots 176 and 178. One end of slot 176 coincides with one end of the slot 178. Slot 176 runs in a vertical direction, and slot 178 runs in a direction displaced angularly with respect to the slot 176. A pin 180 is located for sliding movement in the slots 176 and 178. The pin is situated at the intersection of the two slots, as shown in FIG. 4, when the leg assemblies 138 and 138' are in the normal passenger-supporting position.

The pin 180 is carried by a release lever 182 located at the left side of the forward margin of the lower seat portion. A release lever arm 184 is attached to a release cable 186. The lever 182 is pivoted on the block 168 as shown at 188. When the lever 182 pivots about the pivot point 188, the pin 180 enters the slot 178, thereby lifting the block 168. This relieves the force on the shoe 172, thereby releasing the friction force created by the pads 174, as seen in FIG. 7.

Figure 12A:
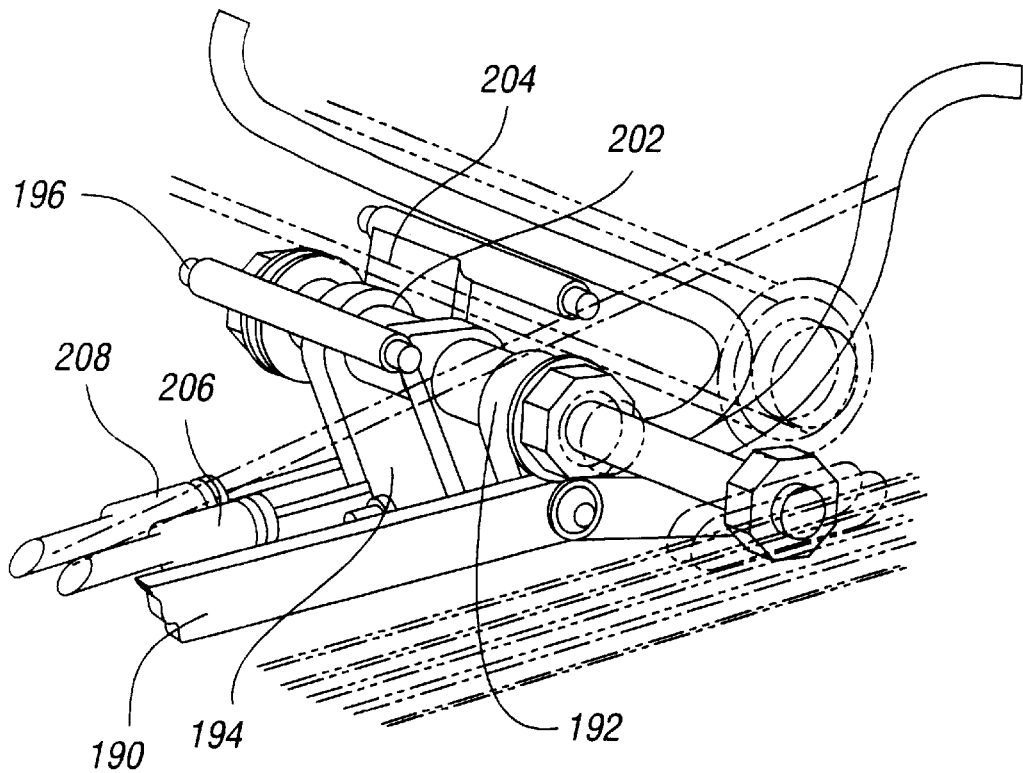
FIG. 12a is an enlarged isometric view showing cable and cam operators for releasing the seat assembly front legs and the rear leg as part of a sequence of stowing steps.
Figure 12B:
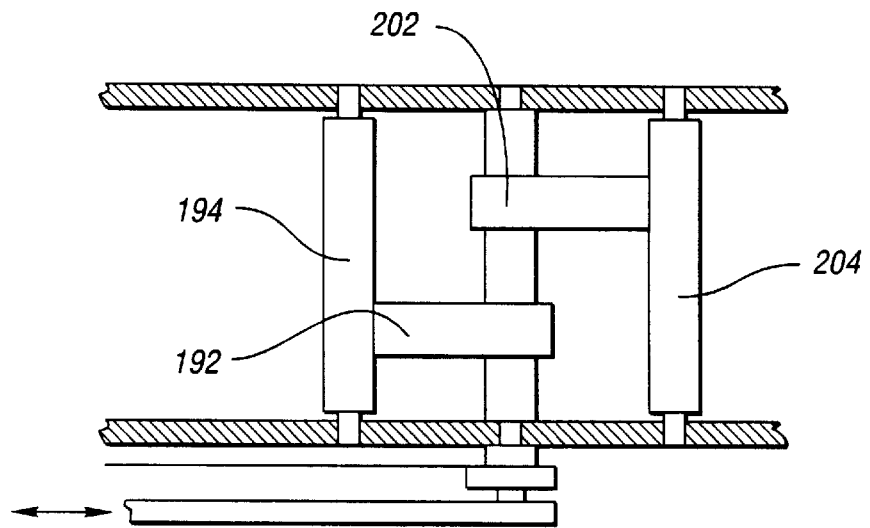
FIG. 12b is an enlarged schematic illustration of cam operators for releasing the front legs and the rear legs as part of a seat stowing procedure or a fore-and-aft seat adjustment procedure.

A handle operable by the operator is located at the forward edge of the lower seat portion. When it is lifted, a lift rod 190, seen in FIG. 12a, is pushed to the right, as viewed in FIG. 12a, thereby moving a two-lobe cam 192. A cam follower plate 194 is moved on its pivot axis 196. A cable 198, seen in FIG. 12d, is actuated by the cam follower 194. As the follower rotates on its pivot axis, the cable end 200 becomes released from an opening in the track 46. A corresponding cable 198' and pin 200' are associated with a track 46' at the right-hand margin of the seat assembly, as seen in FIG. 2. The rear legs for the seat assembly thus become released from the tracks. Movement of the rod also rotates cam 202, which moves cam follower 204, as seen in FIG. 12a. A pair of cables 206 and 208 are connected to the cam follower 204. When the cam 202 is rotated, the lift lever 182 for the left front leg assembly and the corresponding lever for the right front leg assembly are lifted. This releases the front legs in the manner previously described. In this way, both the front legs and the rear legs are released from the track, thereby permitting the seat assembly to be moved in a fore-and-aft direction as the rollers are shifted in the tracks 46 and 46'.

FIG. 12c is a schematic representation of the two-lobe cam 192 and the cam follower 194. Regardless of the direction of rotation of the cam, the follower 194 will actuate the cable 198 to release the rear legs. On the other hand, the single load cam 202, which is schematically illustrated in FIG. 12d will operate the cam follower 204 only when it is rotated in a counterclockwise direction.

During a stowing sequence, the handle that operates the lift rod 190 can be held downward, thereby shifting the lift rod 190 in the opposite direction. This will release the rear legs because the double-lobe cam 192 will move the cam follower 194 regardless of the direction of rotation of the cam 192. The front legs, however, will not be released because of the single direction action of the cam 202. Thus, the seat assembly, during a storing sequence, can be moved forward as the front legs pivot about their lower end. The angle of the front legs changes as they pivot about the axes of the rollers 160 and 160'. When the angles of the front leg assemblies move about 60 degrees, the block 168 is shifted as the pin 180 moves in the slot 178. This relieves the force on the shoe 172 and releases the frictional locking force of the friction pads. The seat assembly then can be moved forward and downward as the front lower leg friction lock is released.

Figure 11C:
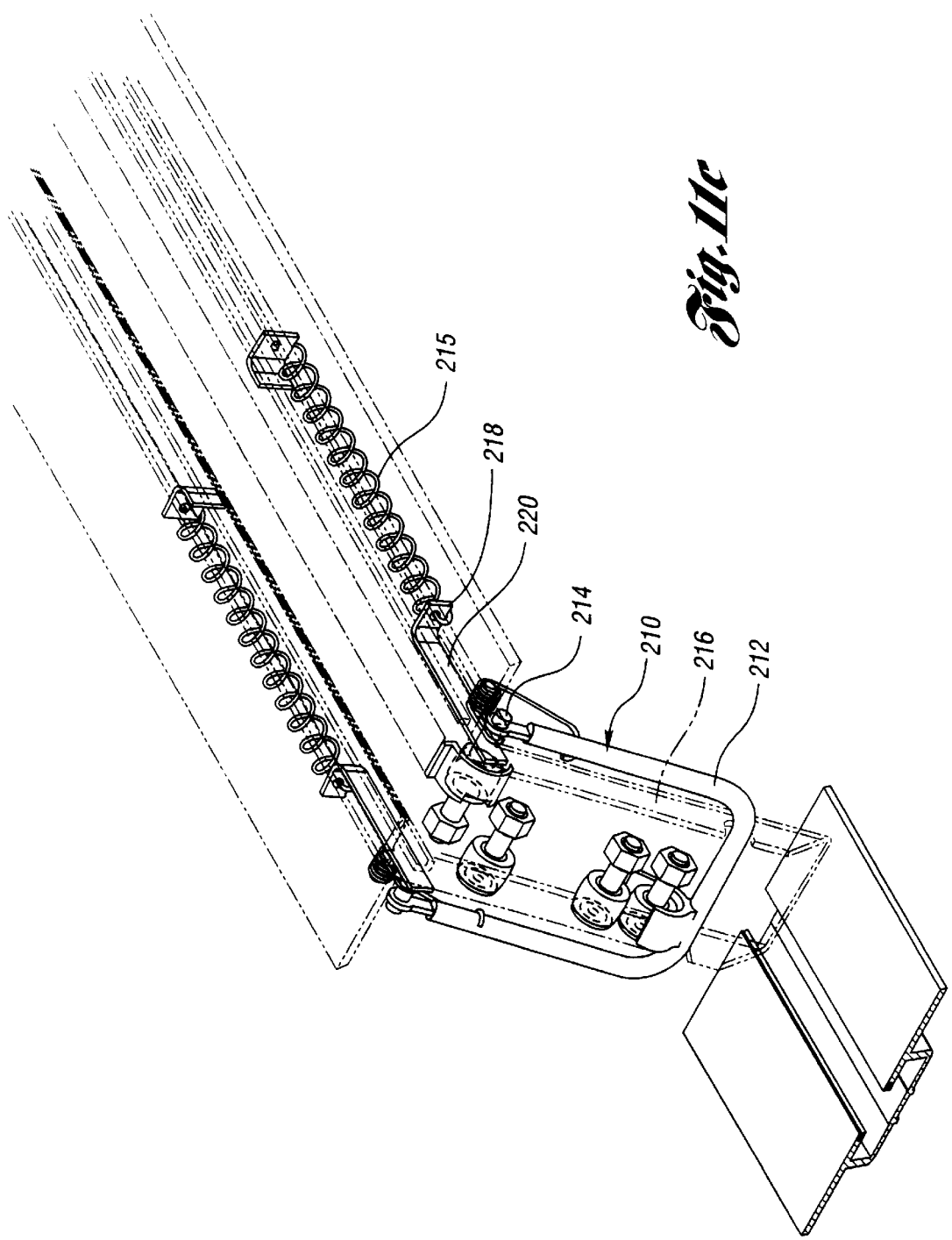

As the rear legs reach the front of the track 46 and 46', the rollers 54 and 42 engage a guide mechanism, illustrated at 210 in FIG. 1 and in FIGS. 11a–11c. This mechanism comprises a stirrup member 212, which is engaged by the forward rollers 54. Farther movement of the seat assembly will cause the springs 215, shown in FIG. 11a, to be compressed. These springs are anchored on the seat track at one 216 and the other end is operatively connected to the stirrup 210, as shown at 218. Farther movement of the folded seat assembly forward will cause the stirrup to assume the position shown in FIG. 11b. At that time, rear rollers 42 engage a stop 211, seen in FIG. 11d, which is welded to the end of tracks 46 and 46'. Still farther movement of the seat assembly will cause the stirrup to pivot about its pivot point 214 as the rollers engage guides 216. The ends of the stirrup 210 are pivoted on slidable supports 220 which are located in the space 222 seen in FIG. 6a within the tracks 46 an 46'. As previously indicated, the springs 215 urge the members 218 in a rearward direction.

The stirrup 212 pivots about the pivot point 214 from the position shown in FIG. 11b to the position shown in FIG. 11c when the pivot point reaches the end of the track 46 or track 46'. The guides 216 position the rollers 42 and 44 as the stirrup assumes the downward position indicated in FIG. 11c. That occurs after the lower ends of the front leg assemblies become unlocked from the tracks 50 and 50' and the leg assemblies are pivoted forward as the seat assembly is shifted forward and downward into the foot well. The guides 216, furthermore, position the rollers for reentry into the tracks 46 and 46' when the stowed seat assembly is moved from the stowed position in the foot well to its normal position on top of the tracks 46 and 46'. A pair of torsion springs, as seen in FIG. 11b at 222, normally biases the stirrup 210 so that it is in alignment with the members 218. That is, the torsion springs normally bias the stirrup toward the position shown in FIG. 11b.

When the handle at the left side of the lower seat portion is pushed down, the rear legs only are released, while the forward legs remain locked at their lower ends to the tracks 50 and 50'. This permits the rollers 54, 44 and 42 to roll in the tracks 46 and 46' as the front legs pivot about their lower ends at the beginning of the seat assembly stowing procedure. When the handle is pulled up, the front legs are released in the manner previously described, and the rear legs simultaneously are unlocked from the track in the manner previously described. This permits the seat assembly to be adjusted fore-and-aft as the seat back portion and the lower seat portion become positioned to accommodate the space requirements of a passenger.

To effect a seat assembly storing operation, the seat back portion is folded over the lower seat portion by triggering movement of the lever 154 seen in FIG. 2 in a counterclockwise direction. This moves the lock bar 146 from the position shown in FIG. 9a to the position shown in FIG. 9b, thereby permitting the front leg assemblies to pivot about their lower ends as the friction pads 174 and 174' lock movement of the shoes 172 and 172' along the tracks 50 and 50'. The shoes are released, however, when the front leg assemblies pivot sufficiently to allow the blocks 168 and 168', as seen in FIG. 7, to be moved out of engagement with the shoes 172 and 172'.

Figure 15A:
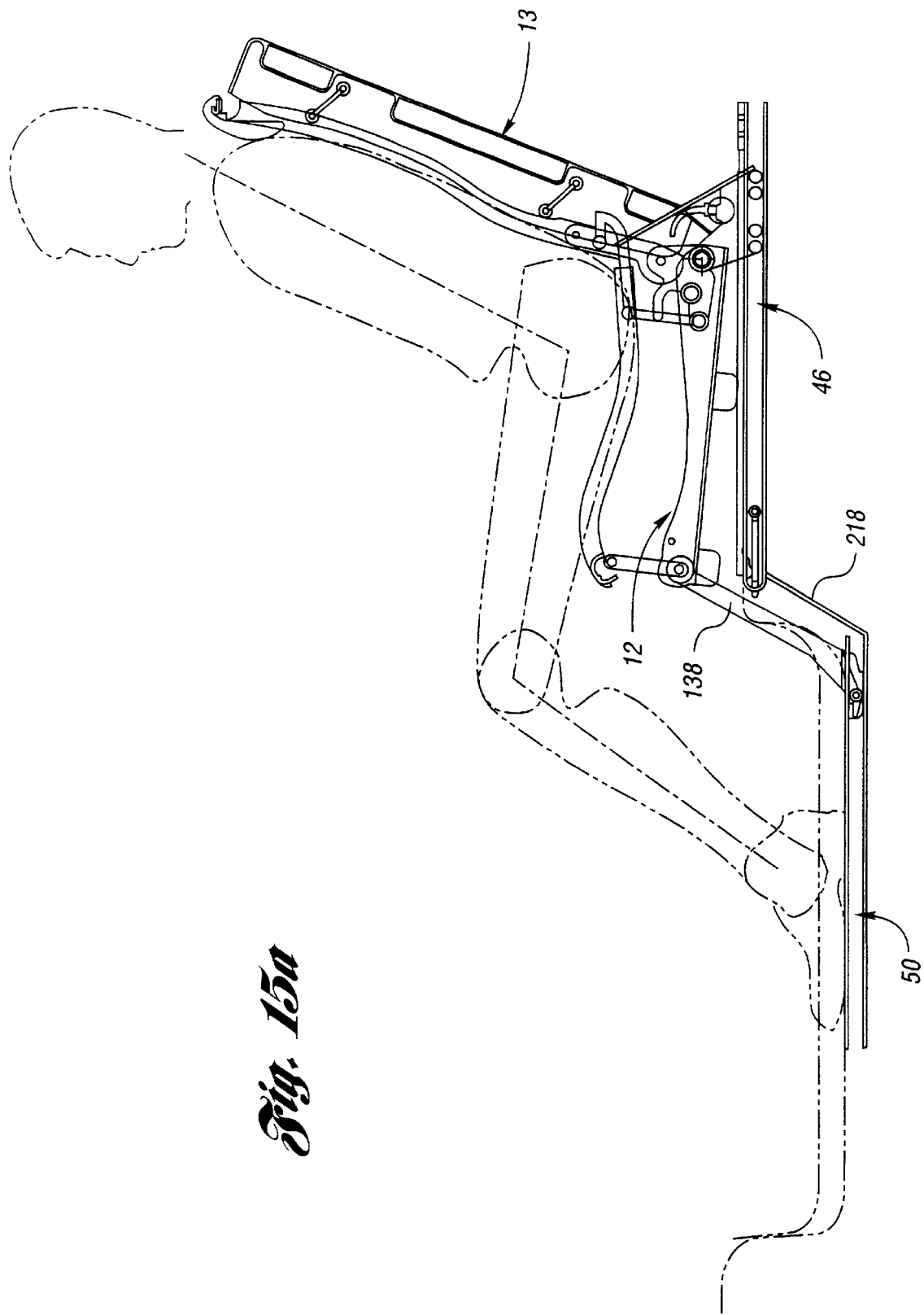

FIGS. 15a and 15b show the fore-and-aft adjustment feature. This requires the operator to pull the handle at the left forward margin of the seat assembly to release the frictional lock at the lower ends of the front leg assemblies 138, 138' and to simultaneously release the lock at the rear of the lower seat assembly. The lever 154 at this time is not activated since the upright seat back portion is not folded forward. Thus, the angular position of the forward leg assemblies will not change, although the frictional lock at the lower ends of the front leg assemblies will be released to permit the fore-and-aft adjustment.

FIG. 15a shows the rearmost passenger-supporting position, and FIG. 15b shows the maximum forward passenger-supporting position.

Figure 16A:
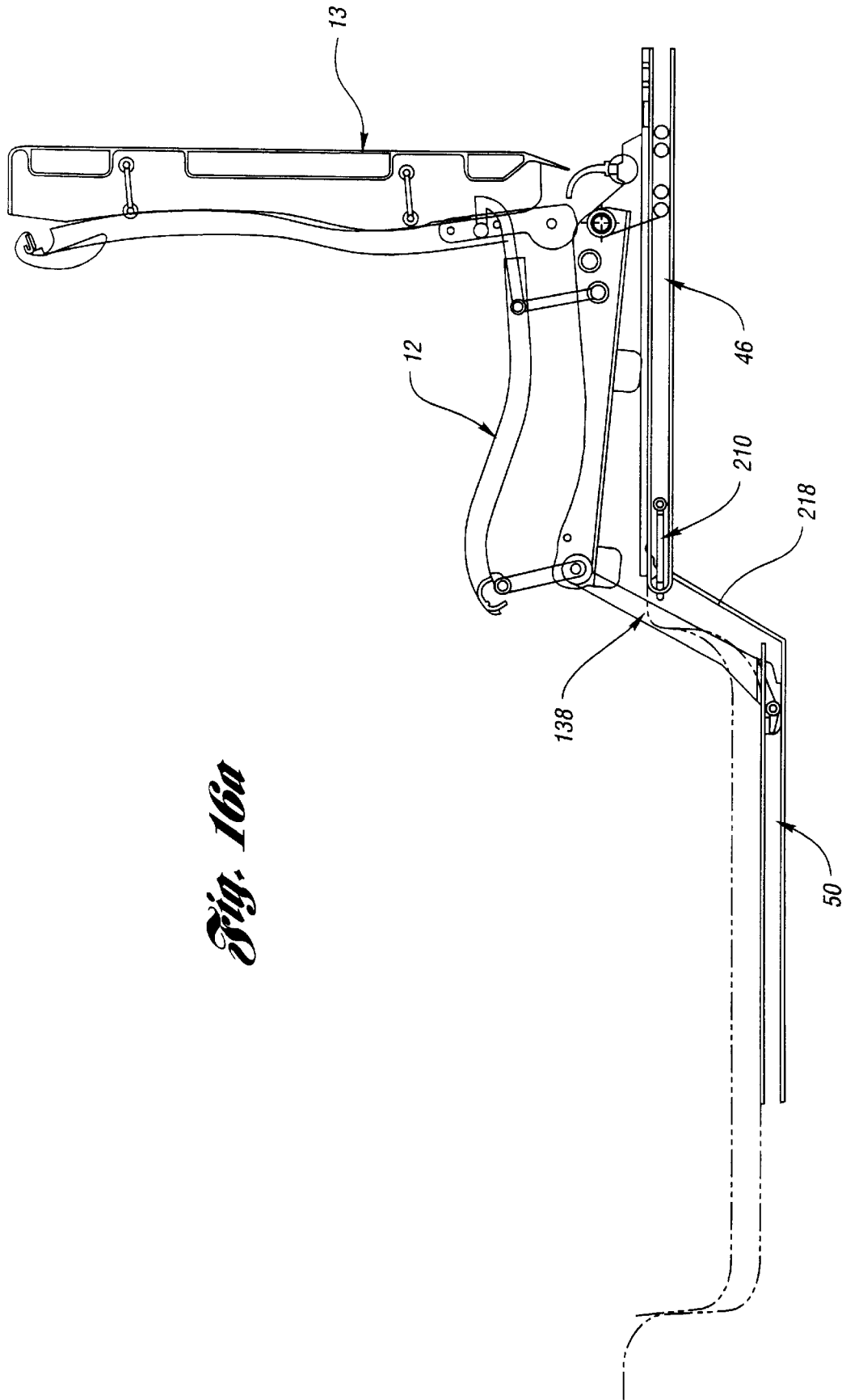
Figure 16B:
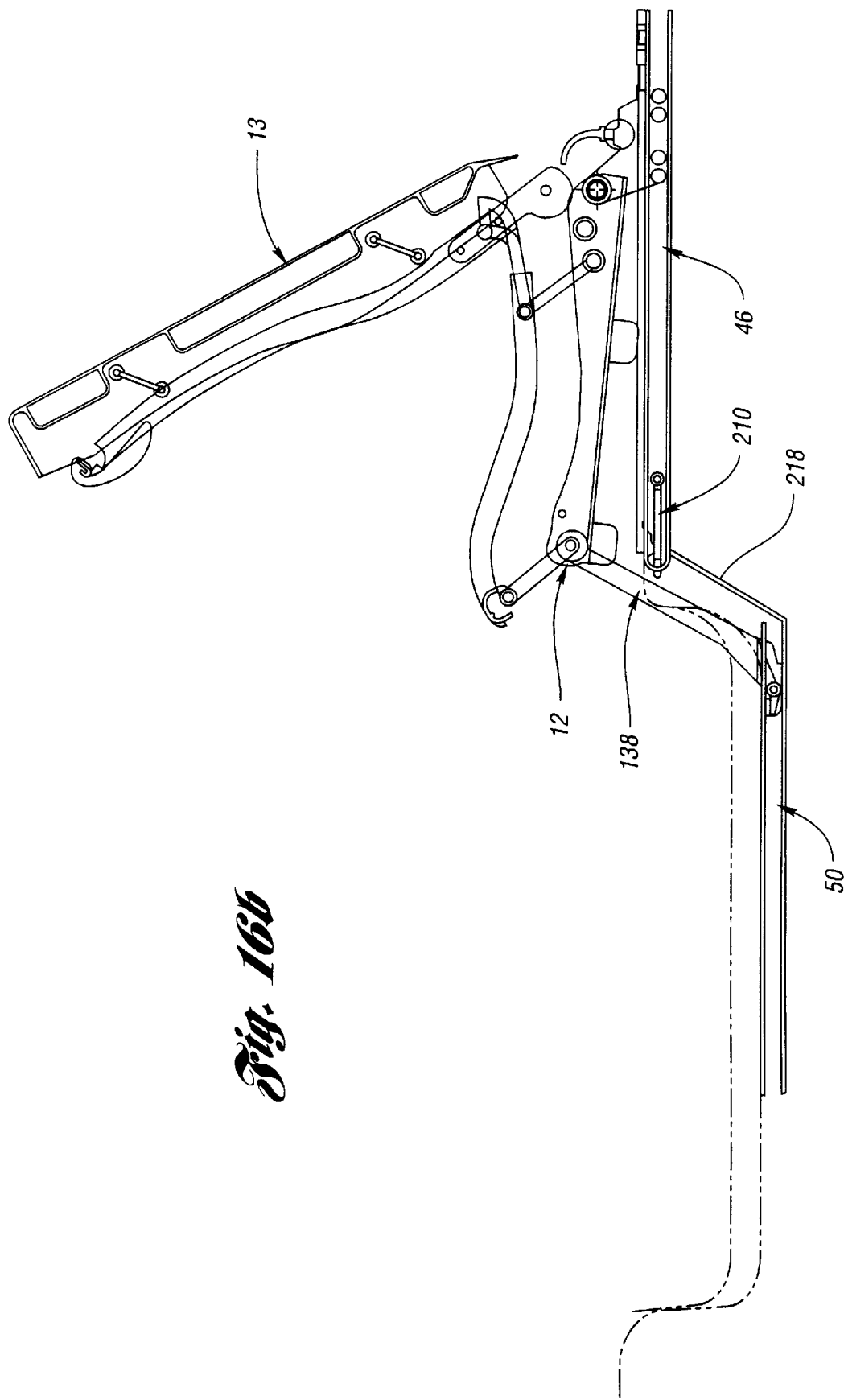
Figure 16C:
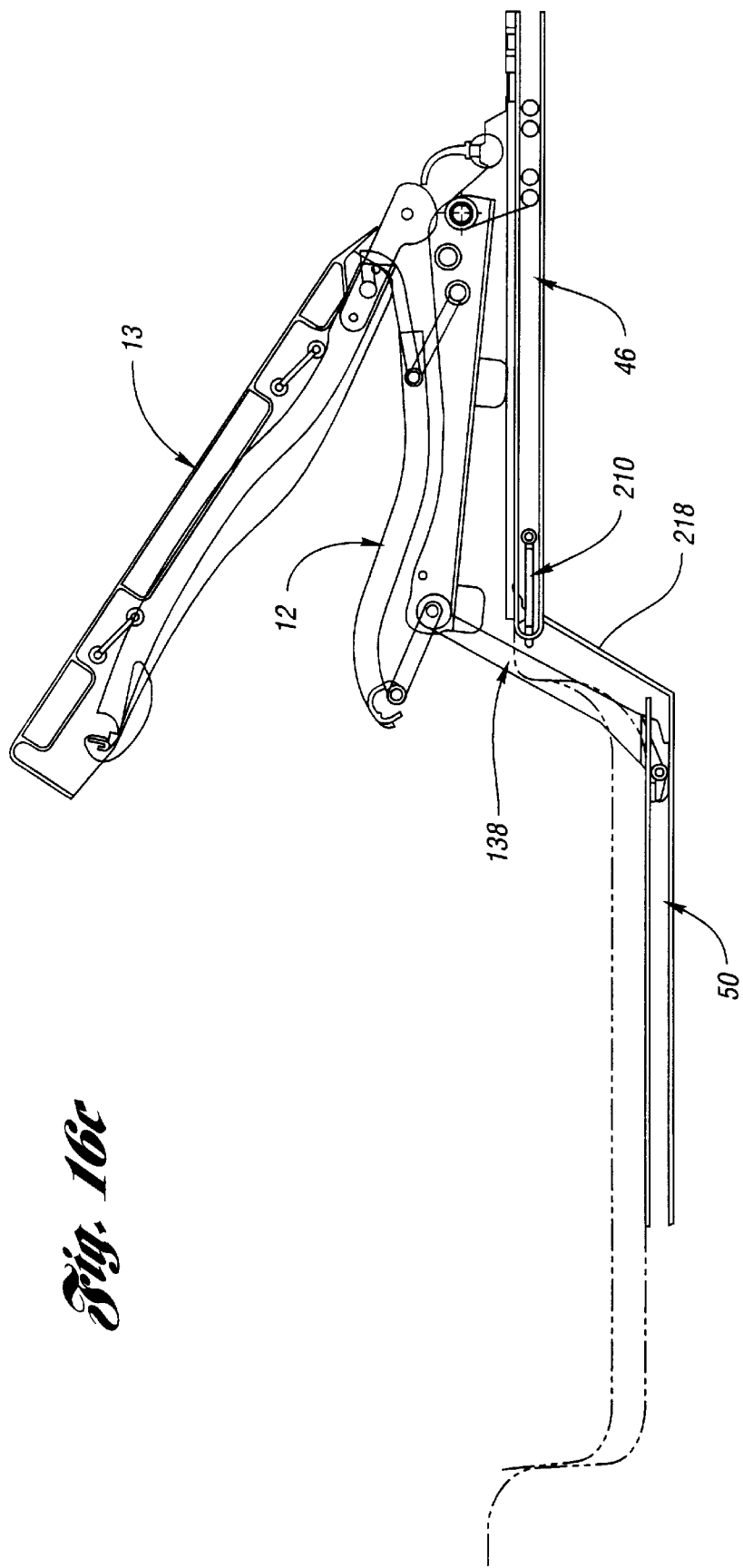
Figure 16B:
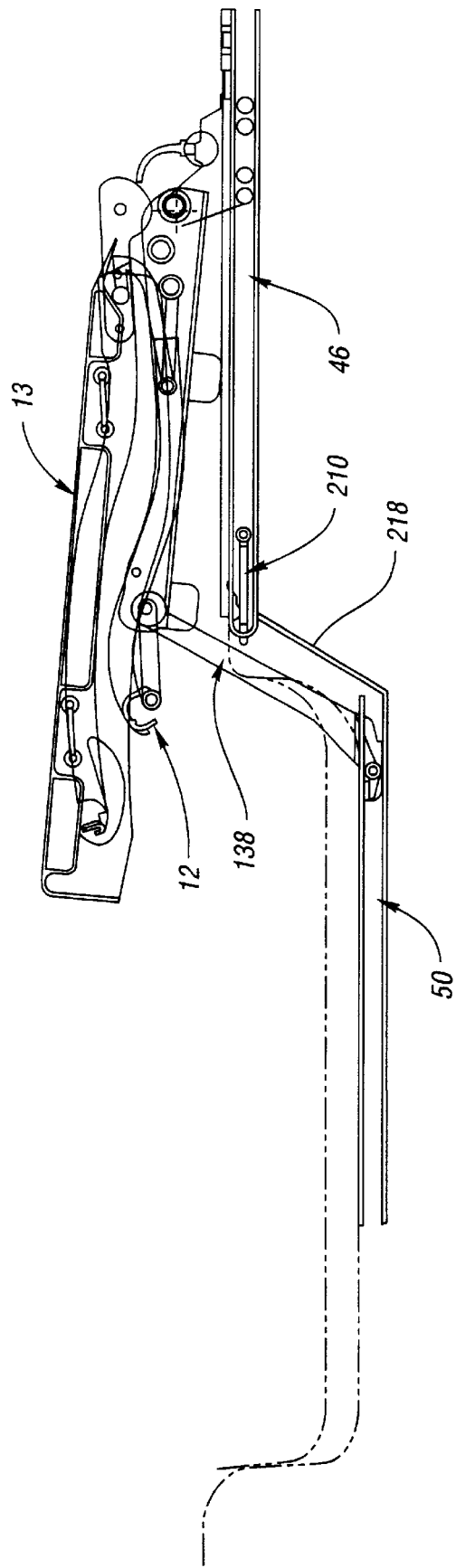

FIGS. 16a–16h show the sequence of the steps involved in the seat assembly storing procedure. Seat back folding is begun by lifting handle 100 on the recliner mechanism. FIG. 16a shows the seat back portion after it has been adjusted forward a few degrees so that it is substantially vertical. Seat back portion 13 is folded after the operator pushes the handle downward, thereby activating the two-lobe cam 192 that operates the cables 198 and 198'. The upper seat portion 13 then is adjusted forward further as seen in FIG. 16b until it reaches the forward position shown in FIG. 16c. The angularity of the forward leg assemblies 138 and 138' remain constant. When the seat back portion is in the position shown in FIG. 16c, the lever 154 is activated, which releases the lock bars 146. This permits the folded seat assembly to travel forward, as seen in FIG. 16d, as the forward leg assemblies 138 pivot.

As seen in FIG. 16e, the seat assembly moves forward and downwardly toward the foot well. FIG. 16f shows the seat assembly approaching the forward margin of the foot well. At that time, the stirrups move out of the tracks 46 and 46', although they remain aligned with the tracks.

FIG. 16 shows the seat assembly in its fully stowed position with the stirrups resting against the guides 218.

A spring inside the front leg assembly upper pivot cross-tube 142 may be used to counter-balance the seat weight as it travels to the stowed position. This assists the operator as the seat is being raised to its upright position.

The rollers 54 engage the bottom of the track space 222, and the rollers 44 and 42 engage the top of the track space 222. This arrangement provides a stable condition for the roller assembly and eliminates a so-called "chucking" condition.

Seat belt restraints shown at 230 may be anchored to a cross-tube 232, seen in FIGS. 2 and 10 at the rear leg assemblies. Thus, it is not necessary for reaction forces to be transmitted through the seat assembly itself. The rear legs, as seen in FIG. 10, may be attached to the seat frame by a pivot tube seen at 234.

While embodiments of the invention have been illustrated and described, it is not intended that these embodiments illustrate and describe all possible forms of the invention. Various modifications may be made without departing from the spirit and scope of the invention. All such modifications and equivalents thereof are covered by the following claims:

What is claimed is:

1. A foldable seat assembly for an automotive vehicle passenger compartment having a bi-level floor structure, first seat tracks being secured to a first part of the floor structure, a second part of the floor structure forward of the first floor structure part defining a foot well lower than the first floor structure part, and second seat tracks in the second floor structure part;

the seat assembly comprising a lower seat portion and a seat back portion, the lower seat portion comprising a frame, the seat back portion being pivotally mounted at a rearward margin of the lower seat portion frame;

rearward legs secured to the lower seat portion frame, rollers on the rearward legs engaging the first seat tracks permitting fore and aft adjustment of the seat assembly;

forward legs attached and releasably locked at their upper ends to the lower seat portion frame at a forward margin thereof, the forward legs having lower ends pivotally engageable with the second seat tracks, the lower ends including a releasable locking mechanism for locking the forward leg lower ends to the second seat tracks to prevent forward movement thereof whereby the seat assembly may be moved forward toward a stowed position in the foot well;

and lever means for releasing the attachment of the forward legs to the lower seat portion thereby permitting the forward legs to pivot about the forward leg lower ends as the seat assembly is being stowed in the foot well.

2. The seat assembly set forth in claim 1 wherein the lower end of each forward leg comprises a tiltable brake element having a friction member at one end thereof, the friction member being frictionally engageable with the one of the second seat tracks to lock the lower end of the forward leg against forward movement, the forward leg including a movable block and a spring means for shifting the movable block into engagement with another end of the brake element, a tilt axis for the brake element being located intermediate its ends, and a roller in the lower end of the forward leg engageable with the one of the second seat tracks.

3. The seat assembly as set forth in claim 2 wherein the forward leg comprises a release lever means including a cam and slot connection with the movable block for shifting the block out of engagement with the brake element to allow the forward leg lower end to move forward.

4. The seat assembly as set forth in claim 2 wherein the cam and slot connection moves the block out of engagement with the brake element against the opposing force of the spring means as the forward leg pivots about its lower end upon movement of the seat assembly toward the stowed position.

5. A foldable seat assembly for an automotive vehicle passenger compartment having a bi-level floor structure, first seat tracks being secured to a first part of the floor structure, a second part of the floor structure rearward of the first floor structure part defining a foot well lower than the first floor structure part, and second seat tracks in the second floor structure part;

the seat assembly comprising a lower seat portion and a seat back portion, the lower seat portion comprising a frame, the seat back portion having a frame pivotally mounted at a rearward margin of the lower seat portion frame;

rearward legs secured to the lower seat portion frame, rollers on the rearward legs engaging the first seat tracks permitting fore and aft adjustment of the seat assembly;

forward legs releasably locked at their upper ends to the lower seat portion frame at a forward margin thereof, the forward legs having lower ends pivotally engageable with the second seat tracks, the lower ends including a releasable locking mechanism for locking the forward leg lower ends to the second seat tracks to prevent forward movement thereof whereby the seat assembly may be moved forward toward a stowed position in the foot well;

and lever means for releasing the attachment of the forward legs to the lower seat portion thereby permitting the forward legs to pivot about the forward leg lower ends as the seat assembly is being stowed in the foot well;

a releasable lock mechanism at the rearward legs for securing the lower seat portion frame to the first seat tracks; and a cam and cable mechanism connected to the releasably lock mechanism for releasing the rearward legs to permit forward movement of the seat assembly for both fore-and-aft seat assembly adjustment and movement of the seat assembly toward a stowed position.

6. The seat assembly set forth in claim 1 including means for adjusting the angle of the seat back portion relative to the lower seat portion, and a trigger lever means on the frame of the lower seat portion which is engageable with the seat back portion as it is folded over the lower seat portion for releasing the upper ends of the forward legs, thereby permitting the forward legs to pivot about their lower ends.

7. The seat assembly set forth in claim 5 including means for adjusting the angle of the seat back portion relative to the lower seat portion, and a trigger lever means on the frame of the lower seat portion which is engageable with the movable upper part of the lower seat portion as it is folded over the lower seat portion for releasing the upper ends of the forward legs, thereby permitting the forward legs to pivot about their lower ends.

8. The seat assembly as set forth in claim 1 including a guide located between the forward end of each first track and the rearward end of each second track to provide a transition between the first and second tracks;

a stirrup assembly at the forward end of the first track engageable with the rollers on the rearward legs as the seat assembly is moved toward its stowed position, the stirrup assembly including a spring means for normally biasing the stirrup assembly rearwardly;

the stirrup assembly including further a rearward sliding member supported by the first track and a forward member hinged at a hinge axis to a rearward sliding member;

the forward member of the stirrup assembly, upon being engaged by the rollers on the rearward legs, moving about the hinge axis toward the guides thereby controlling the motion of the rollers on the rearward legs when the seat assembly enters the foot well.

9. The seat assembly set forth in claim 5 wherein including a guide located between the forward end of each first track and the rearward end of each second track to provide a transition between the first and second tracks;

a stirrup assembly at the forward end of the first track engageable with the rollers on the rearward legs as the seat assembly is moved toward its stowed position, the stirrup assembly including a spring means for normally biasing the stirrup assembly rearwardly;

the stirrup assembly including further a rearward sliding member supported by the first track and a forward member hinged at a hinge axis to said rearward sliding member;

the forward member of the stirrup assembly, upon being engaged by the rollers on the rearward legs, moving about the hinge axis toward the guides thereby controlling the motion of the rollers on the rearward legs when the seat assembly enters the foot well.

10. The foldable seat assembly set forth in claim 1 wherein the seat back portion comprises a cushioned back panel extending across a frame of the seat back portion, pivotal links connecting the back panel to the frame of the seat back portion;

the links being disposed at an acute angle relative to the back panel whereby impact forces on the back panel in a forward direction are modified;

a cable connected to each link and extending over the frame of the seat back portion, one end of the cable being anchored whereby the cable moves the links to an angular position that is non-perpendicular relative to the back panel when the seat back portion is folded forward over the lower seat portion, thereby reducing the stacked thickness of the seat back portion when the seat assembly is stowed in the foot well.

11. The foldable seat assembly set forth in claim 5 wherein the seat back portion comprises a cushioned back panel extending across the frame of the seat back portion, pivotal links connecting the back panel to the frame of the seat back portion;

the links being disposed at an acute angle relative to the back panel whereby impact forces on the back panel in a forward direction are modified; and a cable connected to each link and extending over the frame of the seat back portion, one end of the cable being anchored whereby the cable moves the links to an angular position that is non-perpendicular relative to the back panel when the seat back portion is folded forward over the lower seat portion, thereby reducing the stacked thickness of the seat back portion when the seat assembly is stowed in the foot well.

* * * * *